US011383727B2

(12) United States Patent
Niesen et al.

(10) Patent No.: US 11,383,727 B2
(45) Date of Patent: Jul. 12, 2022

(54) VEHICLE OPERATION BASED ON VEHICULAR MEASUREMENT DATA PROCESSING

(71) Applicant: QUALCOMM Incorporated, San Diego, CA (US)

(72) Inventors: Urs Niesen, Berkeley Heights, NJ (US); Jubin Jose, Belle Mead, NJ (US); Xinzhou Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/121,477

(22) Filed: Sep. 4, 2018

(65) Prior Publication Data

US 2019/0286134 A1 Sep. 19, 2019

Related U.S. Application Data

(60) Provisional application No. 62/645,065, filed on Mar. 19, 2018.

(51) Int. Cl.
*B60W 50/029* (2012.01)
*B60W 50/00* (2006.01)
(Continued)

(52) U.S. Cl.
CPC .... *B60W 50/029* (2013.01); *B60W 30/18145* (2013.01); *B60W 50/0097* (2013.01);
(Continued)

(58) Field of Classification Search
CPC ... B60W 2050/0031–0036; B60W 2050/0089; B60W 2050/0215;
(Continued)

(56) References Cited

U.S. PATENT DOCUMENTS 5,024,285 A * 6/1991 Fujita ................ B60T 8/175
180/197
8,260,486 B2 * 9/2012 Salman ............ B60W 50/0205
701/29.1
(Continued)

FOREIGN PATENT DOCUMENTS

DE 102014211178 A1 6/2015
DE 102015202230 A1 8/2016
(Continued)

OTHER PUBLICATIONS

Kang—KR-101345841-B1 English Translation of Description from Espacenet Patent Translate, Nov. 12, 2019 (Year: 2019).*
(Continued)

*Primary Examiner* — Jeffrey C Boomer
*Assistant Examiner* — Paul Allen
(74) *Attorney, Agent, or Firm* — Weaver Austin Villeneuve & Sampson LLP

(57) ABSTRACT

Methods, apparatuses, and computer-readable media are described. In one example, a method of controlling a vehicle comprises: receiving, using one or more sensors, a first set of measurements of a set of physical attributes of the vehicle in a motion; determining, based on a motion data model that defines a set of relationships among the set of physical attributes of the vehicle in the motion and based on the first set of measurements, a set of expected measurements of the set of physical attributes; determining whether to use an entirety of the first set of measurements to control an operation of the vehicle based on comparing the first set of measurements and the set of expected measurements; and responsive to determining not to use the entirety of the first set of measurements, controlling the operation of the vehicle based on a second set of measurements.

41 Claims, 7 Drawing Sheets

(51) Int. Cl.
| | |
|---|---|
| *B60W 50/023* | (2012.01) |
| *G01C 21/28* | (2006.01) |
| *B60W 50/02* | (2012.01) |
| *B62D 15/02* | (2006.01) |
| *B60W 30/18* | (2012.01) |

(52) U.S. Cl.
CPC ...... *B60W 50/023* (2013.01); *B60W 50/0205* (2013.01); *G01C 21/28* (2013.01); *B60W 2050/0019* (2013.01); *B60W 2050/0034* (2013.01); *B60W 2050/0045* (2013.01); *B60W 2050/0054* (2013.01); *B60W 2050/0083* (2013.01); *B60W 2050/0215* (2013.01); *B60W 2050/0292* (2013.01); *B60W 2420/905* (2013.01); *B60W 2520/06* (2013.01); *B60W 2520/10* (2013.01); *B60W 2520/28* (2013.01); *B60W 2540/18* (2013.01); *B60W 2556/10* (2020.02); *B60W 2556/45* (2020.02); *B62D 15/021* (2013.01)

(58) Field of Classification Search
CPC ......... B60W 2520/28; B60W 2540/18; B60W 50/0205; B60W 2050/0083–0088; B60W 2720/28; B60W 50/0225; B60W 50/029; B60W 2050/0292; B60W 2510/20–207; B60W 30/10; B60W 30/18145; B60W 50/0097; B60W 50/023; B62D 15/021–0245; B62D 1/00; B62D 15/025; B62D 15/0255; G01C 21/165; G01C 21/26; G01C 21/3415; B60R 16/0231; G05D 1/0077; G05D 1/0088; G05D 1/0268; G05D 1/0276; G05D 2201/0213
USPC ...................................... 701/30.8, 30.2–30.3
See application file for complete search history.

(56) References Cited

U.S. PATENT DOCUMENTS

| | | | | |
|---|---|---|---|---|
| 9,915,947 | B1 | 3/2018 | Laforge et al. | |
| 10,204,461 | B2* | 2/2019 | Chen ................... | G07C 5/0808 |
| 10,247,576 | B2* | 4/2019 | Heide .................... | G01D 1/16 |
| 2005/0065666 | A1* | 3/2005 | Miyashita ............. | B60C 19/00 701/1 |
| 2006/0042838 | A1* | 3/2006 | Yeoman ................ | B62D 12/00 180/6.2 |
| 2006/0055240 | A1* | 3/2006 | Toyota ................. | B60W 10/06 303/152 |
| 2006/0255924 | A1* | 11/2006 | Ray ...................... | B60C 23/061 340/444 |
| 2007/0005212 | A1* | 1/2007 | Xu ...................... | B60R 21/0132 701/70 |
| 2009/0043443 | A1* | 2/2009 | Wei ..................... | B62D 15/024 701/31.4 |
| 2010/0019963 | A1* | 1/2010 | Gao ....................... | G01S 5/0027 342/357.31 |
| 2011/0066321 | A1* | 3/2011 | Bechtler ................ | B60T 8/885 701/29.2 |
| 2012/0053853 | A1* | 3/2012 | Tan ...................... | B60W 40/109 702/35 |
| 2012/0303221 | A1 | 11/2012 | Guenthner et al. | |
| 2014/0200770 | A1* | 7/2014 | Bahena ................ | B62D 15/024 701/41 |
| 2014/0257642 | A1* | 9/2014 | Kichise .............. | B62D 15/0235 701/42 |
| 2014/0324300 | A1 | 10/2014 | Halder et al. | |
| 2015/0151747 | A1* | 6/2015 | Fairgrieve ................ | B60T 7/22 701/91 |
| 2016/0272239 | A1* | 9/2016 | Kim ..................... | B62D 15/021 |
| 2019/0188592 | A1* | 6/2019 | Berntorp ................ | G06N 7/005 |
| 2019/0204097 | A1* | 7/2019 | Stams .................... | G06Q 10/20 |
| 2019/0204114 | A1* | 7/2019 | Berntorp ............. | B60W 40/105 |
| 2019/0225233 | A1* | 7/2019 | Tod .................... | B60W 50/0205 |
| 2019/0351941 | A1* | 11/2019 | Uematsu .............. | B60W 30/12 |

FOREIGN PATENT DOCUMENTS

| | | | | |
|---|---|---|---|---|
| DE | 102016005739 | A1 | 1/2017 | |
| DE | 102015220355 | A1 | 4/2017 | |
| EP | 1806256 | A1 * | 7/2007 | .......... B60W 40/105 |
| JP | 2001004313 | A * | 1/2001 | |
| JP | 2002054475 | A * | 2/2002 | |
| KR | 101345841 | B1 * | 12/2013 | ............ B60K 17/34 |
| KR | 20150039966 | A * | 4/2015 | |

OTHER PUBLICATIONS

Lee—English Translation of KR-20150039966-A description via KIPO / Global Dossier, Apr. 10, 2013 (Year: 2013).*

E. Velenis, E. Frazzoli and P. Tsiotras, "On steady-state cornering equilibria for wheeled vehicles with drift," Proceedings of the 48h IEEE Conference on Decision and Control (CDC) held jointly with 2009 28th Chinese Control Conference, Shanghai, 2009, pp. 3545-3550, doi: 10.1109/CDC.2009.5399782. (Year: 2009).*

Two-wheel drive—Wikipedia—capture of https://en.wikipedia.org/wiki/Two-wheel_drive via archive.org from Feb. 5, 2017 (Year: 2017).*

Taniguchi, Hiroyuki—English Description of JP-2002054475-A via Espacenet Patent Translate, retrieved Jan. 7, 2022 (Year: 2022).*

ITO—English Translation of JP-2001004313-A via Espacenet Patent Translate, retrieved Apr. 8, 2022 (Year: 2002).*

International Search Report and Written Opinion—PCT/US2019/021348—ISA/EPO—dated Jun. 13, 2019.

* cited by examiner

VEHICLE OPERATION BASED ON VEHICULAR MEASUREMENT DATA PROCESSING

RELATED APPLICATION

This patent application claims priority to U.S. Provisional Patent Application Ser. No. 62/645,065, filed Mar. 19, 2018, entitled "VEHICULAR MEASUREMENT DATA PROCESSING" which is assigned to the assignee hereof and is incorporated herein by reference in its entirety for all purposes.

BACKGROUND

Modern vehicles have many on-board sensors. The on-board sensors can be controlled to perform vehicular measurements to generate data about a state of a motion of the vehicle such as, for example, a direction of the motion of the vehicle, a speed of the vehicle along a direction, etc. The sensor data can be combined with data from other sources to control one or more operations of the vehicle. The vehicular measurements can be performed continuously or over certain period of time, and the sensor data can be aggregated and/or integrated over time to determine the state of motion. However, due to various reasons, some or all of the sensor data obtained at a certain time point may not reflect accurately the actual state of the motion of the vehicle. Embodiments of the present disclosure can exclude, or otherwise deemphasize, those outlier data in the determination of the state of motion of a vehicle, to improve the operation of the vehicle.

SUMMARY

In some examples, a method of controlling a vehicle is provided. The method comprise: receiving, using one or more sensors, a first set of measurements of a set of physical attributes of the vehicle in a motion; determining, based on a motion data model that defines a set of relationships among the set of physical attributes of the vehicle in the motion and based on the first set of measurements, a set of expected measurements of the set of physical attributes; determining whether to use an entirety of the first set of measurements to control an operation of the vehicle based on comparing the first set of measurements and the set of expected measurements; and responsive to determining not to use the entirety of the first set of measurements, controlling the operation of the vehicle based on a second set of measurements.

In some examples, an apparatus for controlling a vehicle is provided. The apparatus comprises a memory that stores a set of instructions and a motion data model that defines a set of relationships among a set of physical attributes of the vehicle in a motion; and a hardware processor configured to execute the set of instructions to: receive, from one or more sensors, a first set of measurements of the set of physical attributes of the vehicle in the motion; determine, based on the motion data model and the first set of measurements, a set of expected measurements of the set of physical attributes; determine, based on comparing the first set of measurements and the set of expected measurements, whether to use an entirety of the first set of measurements to control an operation of the vehicle; and responsive to determining not to use the entirety of the first set of measurements, control the operation of the vehicle based on a second set of measurements.

In some examples, a system to control an operation of a vehicle is provided. The system comprises: a network bus; one or more sensors coupled with the network bus; and at least one processor coupled with the network bus and configured to: receive, from the one or more sensors and via the network bus, a first set of measurements of a set of physical attributes of the vehicle in a motion; determine, based on a motion data model that defines a set of relationships among the set of physical attributes of the vehicle in the motion and based on the first set of measurements, a set of expected measurements of the set of physical attributes; determine, based on comparing the first set of measurements and the set of expected measurements, whether to use an entirety of the first set of measurements to control the operation of the vehicle; and responsive to determining not to use the entirety of the first set of measurements, use a second set of measurements to control the operation of the vehicle.

In some examples, a non-transitory computer readable medium is provided. The non-transitory computer readable medium stores a set of instructions which, when executed by a hardware processor, causes the hardware processor to: receive, from one or more sensors, a first set of measurements of a set of physical attributes of a vehicle in a motion; determine, based on a motion data model that defines a set of relationships among the set of physical attributes of the vehicle in the motion and based on the first set of measurements, a set of expected measurements of the set of physical attributes; determine, based on comparing the first set of measurements and the set of expected measurements, whether to use an entirety of the first set of measurements to control an operation of the vehicle; and responsive to determining not to use the entirety of the first set of measurements, control the operation of the vehicle based on a second set of measurements.

In some examples, an apparatus for controlling a vehicle is provided. The apparatus comprises: means for obtaining a first set of measurements of a set of physical attributes of the vehicle in a motion; means for, based on a motion data model that defines a set of relationships among the set of physical attributes of the vehicle in the motion and based on the first set of measurements, determining a set of expected measurements of the set of physical attributes; means for determining, based on comparing the first set of measurements and the set of expected measurements, whether to use an entirety of the first set of measurements to control an operation of the vehicle; and means for responsive to determining not to use the entirety of the first set of measurements, controlling the operation of the vehicle based on a second set of measurements.

BRIEF DESCRIPTION OF DRAWINGS

Non-limiting and non-exhaustive aspects are described with reference to the following figures, wherein like reference numerals refer to like parts throughout the various figures unless otherwise specified.

Figure 1:
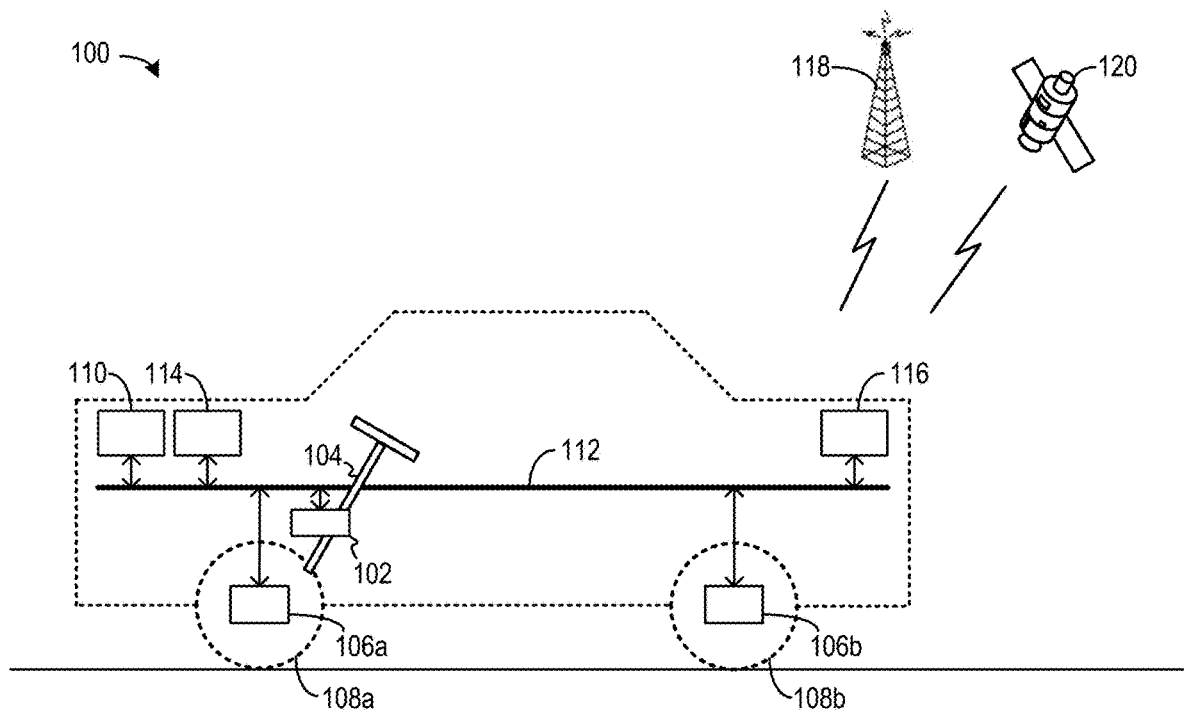
FIG. 1 illustrates examples of electronic components of a vehicle for performing vehicular measurements according to embodiments of the present disclosure.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

Several illustrative embodiments will now be described with respect to the accompanying drawings, which form a part hereof. The ensuing description provides embodiment (s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Modern vehicles have many on-board sensors. The on-board sensors can be controlled to perform vehicular measurements for a set of vehicle-related physical attributes/ quantities including, for example, the steering angle of a vehicle, the rotational speeds of the wheels of the vehicle, etc. As used herein, "vehicle-related physical attributes" (or vehicle-related physical quantities) can include any physical attribute/quantity related to a vehicle. Vehicle-related physical attributes can include attributes/quantities related to a vehicle and can refer to both the vehicle as a whole or different components of the vehicle. Vehicle-related physical attributes may include attributes that are related or unrelated to a motion of the vehicle. Non-limiting examples of vehicle-related physical attributes may include motion characteristics of the vehicle, an orientation of the vehicle, a motion vector or velocity vector of the vehicle, the rotational speeds of the wheels of the vehicle, a steering angle of the steering column of the vehicle, a physical dimension of the vehicle (e.g., wheelbase distance, track width, etc.). Throughout the specification, "vehicle-related physical attributes," "vehicle-related physical quantities," "physical attributes," and "physical quantities" are used interchangeably.

The vehicular measurement data can be used to estimate a state of a motion of the vehicle including, for example, a direction of motion of the vehicle (e.g., which direction the vehicle is facing), a speed of the vehicle along the direction to control an operation of the vehicle, etc. For example, the steering angle can measure an angle of a steering column and/or a steering wheel with respect to a reference point, and the angle can indicate an instantaneous direction of motion of the vehicle (e.g., at which direction the vehicle is facing) when the vehicle is steered to go straight or to make a turn. Moreover, the rotational speeds of the vehicle can be used to estimate a linear speed of the vehicle towards an instantaneous direction. The instantaneous direction as well as linear speed information can be used to control one or more operations of the vehicle.

As used herein, "controlling an operation of a vehicle" (or "controlling a vehicle") broadly covers controlling any vehicle-related operations. The vehicle-related operations may include controlling a state of motion of the vehicle including, for example, steering, acceleration, braking (or deceleration), starting a movement, stopping at a location, maintaining movement in a lane, performing lane change, etc. The vehicle-related operations may include controlling various components of the vehicle to set the state of motion of the vehicle. One example of an vehicle-related operation may include autonomous driving. For example, the instantaneous direction as well as linear speed information can be fed back to an autonomous driving controller, which can adjust the steering angle and/or the moving speed of the vehicle to, for example, reach a target location. The vehicle-related operations may also include detecting a state of motion and/or a location of the vehicle such as, for example, a navigation operation. For example, the instantaneous direction as well as linear speed information can be integrated over time to determine an instantaneous location of the vehicle for navigation. It is understood that different vehicle-related operations may interplay with each other. For example, an autonomous driving operation may interplay with a navigation operation, with the navigation operation providing information indicating a current state of motion and/or a current location of the vehicle, and the information can be provided to an autonomous driving operation to control the future state of motion of the vehicle.

The correlation between the vehicular measurements and the actual state of motion of the vehicle may change depending on an operation condition of the vehicle. For example, due to slippage of the wheels, the differences in the rotational speeds between a pair of front wheels (and/or between a pair of rear wheels) may not provide a reliable indication of the actual direction of motion of the vehicle and/or the actual speed of the vehicle. Moreover, in a case where the wheel skids, the steering may no longer control the direction of motion of the vehicle, and the steering angle may not provide a reliable indication of the actual direction of motion of the vehicle. If the steering angle and/or the rotational speeds of the wheels are treated as reliable indicator of a state of motion of the vehicle when they are not, and are fed into the navigation and/or autonomous driving system, incorrect operations may result. For example, large position errors may result which can lead to inaccurate navigation. As another example, the autonomous driving system may produce inaccurate control decisions (e.g., incorrect steering, incorrect engine power setting, etc.) based on inaccurate vehicle's speed and/or moving direction estimations. The inaccurate control decision not only can lead to the vehicle being maneuvered to unintended locations but also can introduce safety hazards to the passenger and to other road users.

The present disclosure is generally related to vehicle operation and, more specifically, to processing of vehicular measurement data obtained from sensors of a vehicle to filter out or de-emphasize potentially erroneous measurements, and using the processed vehicular measurement data to control one or more operations of the vehicle. In some examples, a method of operating a vehicle may comprise obtaining a model that defines a set of relationships among a set of different physical attributes/quantities of a vehicle in a motion. The method further comprises obtaining, from one or more sensors, a first set of measurements of the set of physical attributes to control an operation of the vehicle related to the motion, and determining a degree of conformance for each of the first set of measurements to the model. The method further comprises: determining, based on the degrees of conformance, whether to control the operation of the vehicle based on the first set of measurements and, responsive to determining not to control the operation of the vehicle based on the first set of measurements, controlling the operation of the vehicle based on a second set of measurements. The second set of measurements can be obtained from the one or more sensors at a different time from the first set of measurements, or can be obtained from other data sources.

With the disclosed techniques, a model can be provided to define the relationships among a set of physical attributes including, for example, the steering angle of a vehicle and the rotational speeds of the vehicle. The relationships can be defined based on all these physical attributes can be used to determine a common state of motion of the vehicle (e.g., a direction of motion). A determination can be made about how well a set of vehicular measurement data for the set of physical attributes conforms to the model, and non-conforming data can be discarded altogether, or at least de-emphasized, when the set of vehicular measurement data are used to control an operation of the vehicle. With such arrangements, the effect of outlier measurement data (e.g., data that do not correlate with the actual state of motion of the vehicle) can be mitigated, which can improve the operation of the vehicle as well as safety.

FIG. 1 illustrates an example of electronic components of a vehicle. In the example of FIG. 1, a vehicle 100 may include numerous sensors to measure or to estimate various physical attributes/quantities of vehicle 100. For example, vehicle 100 may include a steering angle sensor 102 coupled with a steering column 104 to measure a steering angle of vehicle 100. The steering angle measurement can be integrated over time to determine an instantaneous direction of motion of vehicle 100. In addition, vehicle 100 may also include a wheel speed sensor (e.g., wheel speed sensors 106 including wheel speed sensors 106a and 106b) coupled with each of the wheels of vehicle 100 (e.g., wheels 108a and 108b). A wheel speed sensor coupled with a wheel can measure a rotational speed of the wheel. The rotational speed (e.g., in angular form) can be converted to a linear speed of vehicle 100 based on the diameters of wheels 108a and 108b.

Steering angle sensor 102 and wheel speed sensors 106 can perform the measurements in various ways. For example, steering angle sensor 102 can include an image sensor (e.g., an optical sensor) to obtain images of a set of patterns on a circumference of the steering column 104, which can be used to determine a rotational angle of steering column 104 and an orientation of the front wheels steered by the steering column. A pattern can be encoded based on a location of the pattern on the circumference. An image processor can detect a pattern from the images provided by the optical sensor, and a rotation angle of the steering column, as well as the steering angle of vehicle 100, can be determined by the image processor. Moreover, wheel speed sensors 106 (e.g., wheel speed sensor 106a) can include an optical sensor to detect a marker on a wheel shaft of a wheel (e.g., wheel 108a). As the wheel shaft rotates, a pattern of detection (and non-detection) of the marker by the optical sensor may result, and the rotational speed of the wheel can be determined based on a time elapsed between a detection and a re-detection of the marker by the optical sensor. Steering angle sensor 102 and wheel speed sensors 106 may also include other types of sensors. For example, steering angle sensor 102 and wheel speed sensors 106 can include torque sensors to measure a torque exerted on, respectively, the steering wheel and the wheel shafts. As another example, steering angle sensor 102 and wheel speed sensors 106 can also include electric current sensors to measure electric currents supplied to, for example, motors that assist or drive the steering column and the wheel shafts. The torque and electric current measurements can be used to measure the steering angle and the rotational speeds of the wheels.

Vehicle 100 may also include other sensors, such as inertial measurement unit (IMU) 110, etc., which can also provide measurements about a direction of motion and/or a speed of motion of vehicle 100. For example, IMU 110 may include accelerometers and gyroscopes to detect, respectively, a linear acceleration and a speed of rotation of vehicle 100. The linear acceleration and speed of rotation measurements of vehicle 100 can also be integrated over time to determine an instantaneous direction of motion as well as a displacement of vehicle 100. The instantaneous direction of motion and the displacement can also be integrated to track a location of vehicle 100.

The vehicular measurement data obtained by steering angle sensor 102, wheel speed sensors 106, and IMU 110 can be provided to control one or more operations of the vehicle. For example, the vehicular measurement data can be transmitted over a network 112, such as a Controller Area Network (CAN), to an application platform 114. In some examples, application platform 114 may include or may be part of a navigation module and can determine a location of vehicle 100 based on the vehicular measurement data. Application platform 114 can provide an output (e.g., visual display, audio output, etc.) indicating the location of vehicle 100, the speed of vehicle 100, a direction of movement (e.g., based on a steering angle measurement) of vehicle 100, etc. In some examples, application platform 114 may also be part of a mobile phone that can tap into the CAN bus to obtain the location, speed, and direction information of vehicle 100 to provide navigation information.

In some examples, application platform 114 may include or may be part of an autonomous driving module, a drive-by-wire system, etc., and can determine an instantaneous state of movement (e.g., speed, steering angle, etc.) of vehicle 100 based on the measurement data. Based on a difference between the instantaneous state of movement and a target state of movement (e.g., a speed difference, a steering angle difference, or any combination thereof), application platform 114 can adjust the throttle of the engine, a quantity of current supplied to the electric motors that drive the wheels, a steering angle, etc., to adjust the state of movement of vehicle 100. In some examples, the vehicular measurement data can also be combined with location/speed data obtained from other sources to refine the location/speed determination of vehicle 100. For example, vehicle 100 may include a wireless transceiver 116 to receive wireless signals from cell tower 118 and/or satellite 120. The wireless signals may include, for example, Global Positioning System (GPS) signals, Observed Time Difference Of Arrival (OTDOA) signals, etc. for location determination. As to be described below, the location information based on GPS and OTDOA signals can be combined (or used as an alternative) with the vehicular measurement data for location determination.

Figure 2A:
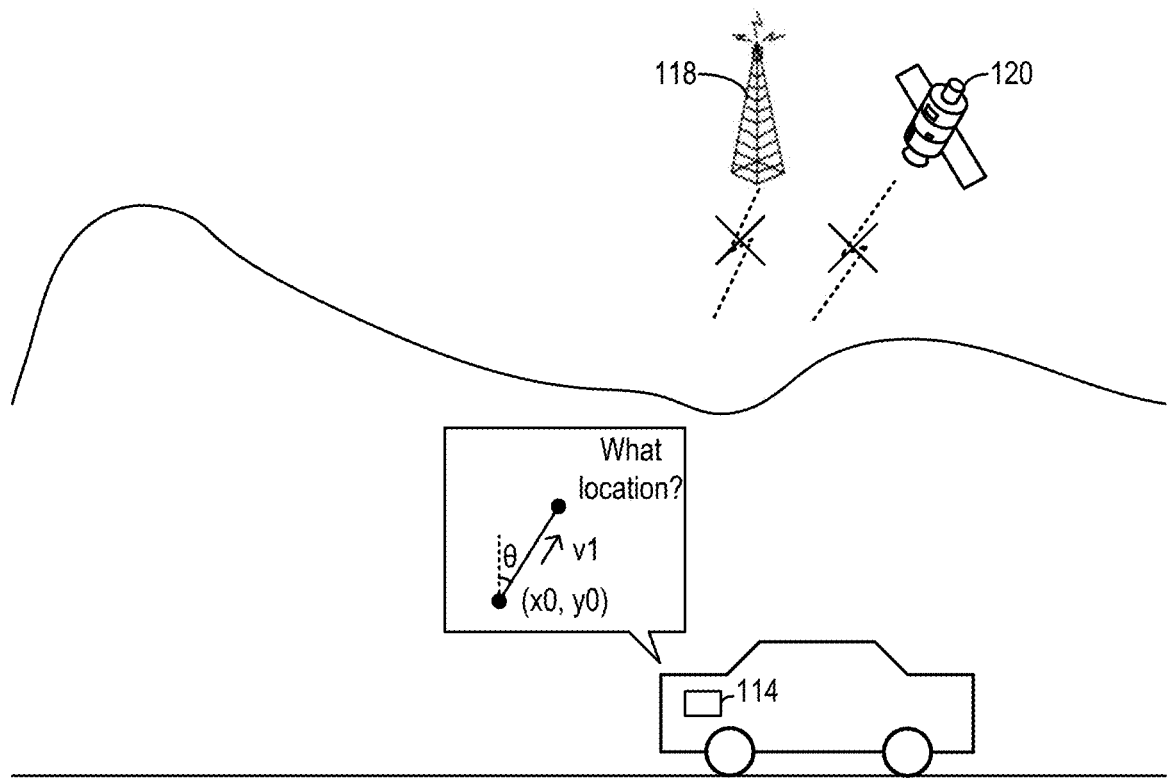
FIGS. 2A and 2B illustrate examples of operations of a vehicle supported by the electronic components of FIG. 1.
Figure 2B:
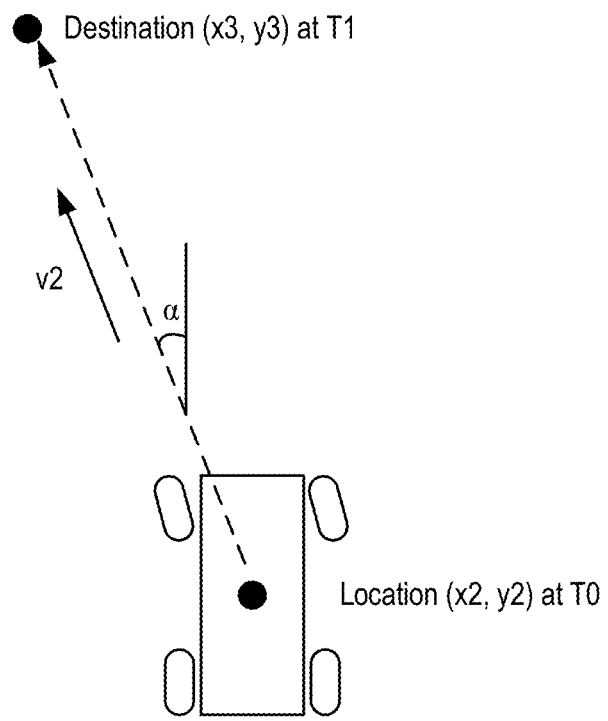

Application platform 114 can combine the vehicular measurement data from the sensors with location information derived from those wireless signals to control one or more operations of vehicle 100. FIGS. 2A and 2B illustrate examples of operations of vehicle 100 that can be provided by application platform 114. In the example of FIG. 2A, application platform 114 may include or may be part of an navigation system configured to estimate a location of vehicle 100 based on available GPS and/or OTDOA signals. When vehicle 100 travels in a landscape where those wireless signals are not available, however, application platform 114 may estimate a current location of vehicle 100 based on a last known location of vehicle 100 (represented by co-ordinates (x0, y0) in FIG. 2A), as well as a displacement of the vehicle over a time period between a current time and a prior time when the vehicle was at the last known location. The displacement of the vehicle can be determined based on, for example, a travel direction (denoted by "θ" in FIG. 2A) and a travel speed of the vehicle (denoted by "v1" in FIG. 2A) during that time period. The travelling direction can be determined by, for example, integrating the changes in the steering angle or the direction of motion of vehicle 100 based on measurement data provided by steering angle sensor 102 and/or IMU 110. The speed of the vehicle can be determined based on, for example, the rotational speeds of the wheels of vehicle 100 provided by wheel speed sensors 106 and/or measurement data provided by IMU 110. In some examples, the vehicular measurement data (e.g., a travel speed and/or a travel direction of vehicle 100) can also be used to augment the GPS and/or OTDOA signals to improve the precision of the location determination of vehicle 100.

As part of the navigation system, application platform 114 can provide additional information based on the estimated current location of vehicle 100. For example, application platform 114 can determine, based on the estimated current location and a target location of vehicle 100, a set of routes to reach the target location, and output signals (e.g., real-time turn-by-turn instructions in audio or in display forms) to provide guidance to the driver to navigate through the set of routes. Application platform 114 can also update the set of routes based on the estimated current location of vehicle 100 and other events (e.g., traffic accidents, traffic jams, the driver not following the routes, etc.) and provide updated guidance to the driver.

Moreover, in the example of FIG. 2B, application platform 114 can also be part of an automatic driving system configured to control vehicle 100 to reach a pre-determined destination at a pre-determined time. For example, vehicle 100 may be at a location associated with co-ordinates (x2, y2) at time T0, and application platform 114 may be configured to control vehicle 100 to reach another location associated with co-ordinates (x3, y3) at time T1. Application platform 114 can determine a travel direction (denoted by "α" in FIG. 2B) and a travel speed of the vehicle (denoted by "v2" in FIG. 2B) based on the relative locations of co-ordinates (x2, y2) and (x3, y3). For example, to achieve the determined travel direction, application platform 114 can control the steering of vehicle 100 (e.g., by moving the steering wheel and/or steering column 104 via an actuator) based on monitoring, for example, the steering angle and/or the direction of motion of vehicle 100 from the measurement data provided by steering angle sensor 102 and/or IMU 110. Moreover, to achieve the determined travel speed, application platform 114 can control the speed of vehicle 100 (e.g., by controlling the throttle of an engine of the vehicle, by controlling the electric current supplied to the electric motors that propel the vehicle, etc.) based on monitoring, for example, the rotational speeds of the wheels of vehicle 100 provided by wheel speed sensors 106 and/or measurement data provided by IMU 110.

While the vehicular measurement data can be very useful for different operations of a vehicle, there can be inaccuracies in the vehicular measurement data which can degrade the accuracy of the location determination of the vehicle. For example, due to wheel slippage and skidding, the rotational speeds of the wheels may not translate to the linear speed of the vehicle. Moreover, if a vehicle skids when making a turn (e.g., skids to the left while making a right turn), the steering angle of the vehicle also may not reflect accurately the direction of motion of the vehicle. These errors in the vehicular measurement data may be dynamic in nature and may occur only during a short period of time or under a very specific operation condition (e.g., when the vehicle skids), yet these errors can lead to an erroneous estimation of the vehicle's travel speed, travel direction, and/or current location, etc., which in turn degrades the operations of the vehicle (e.g., a navigation system of FIG. 2A, an autonomous driving system of FIG. 2B, etc.) that rely on these vehicular measurement data.

Embodiments of the present disclosure propose techniques to detect potentially erroneous vehicular measurements. In some examples, a measurement data processing system may be coupled with a controller that controls one or more operations of a vehicle (e.g., application platform 114) based on the vehicular measurement data. Measurement data processing system can receive a set of vehicular measurement data which measures a state of motion of the vehicle at a certain time from the sensors of a vehicle (e.g., steering angle sensor 102, wheel speed sensors 106a and 106b, IMU 110, etc.), and determine whether there is potentially erroneous vehicular measurement in the data. If no potentially erroneous vehicular measurement is detected, measurement data processing system can forward the data to the controller.

On the other hand, if measurement data processing system detects potentially erroneous vehicular measurement in the data, measurement data processing system may take various actions. For example, the measurement data processing system may withhold the data from the controller, obtain a new set of vehicular measurement data (provided by the sensors at a subsequent time), and forward the new set of vehicular measurement data to application platform 114 if the new set of vehicular measurement data conforms to the model. The measurement data processing system may also procure measurement data from other sources (e.g., IMU 110) and provide the measurement data to application platform 114 in place of the erroneous vehicular measurements. As another example, the measurement data processing system may also forward the data together with indication that the data contain one or more potentially erroneous vehicular measurements to the controller, which can then decide how to handle the data based on the indication. For example, the controller may also discard the data. The controller may also aggregate and/or integrate the data with prior vehicular measurements and/or with data from other sources, but assign a low weight to the data based on the erroneous vehicular measurements indication. For example, in a case where the controller performs an operation related to location determination of the vehicle (e.g., navigation operation of FIG. 2A, autonomous driving operation of FIG. 2B, etc.), the controller may use the GPS or OTDOA signals instead of the set of potentially erroneous vehicular measurements, or assign a very low weight to the vehicular measurements relative to the GPS or OTDOA signals, for the location determination.

In some examples, measurement data processing system can employ a motion data model to detect potentially erroneous vehicular measurement. The motion data model may define a set of mathematical relationships among a set of physical attributes of a vehicle when the vehicle is in a motion. The set of mathematical relationships can relate, for example, the value of one physical attribute of a set of physical attributes with value(s) of other physical attribute(s) within the same set of physical attributes. The data processing system can obtain a set of vehicular measurements corresponding to the set of physical attributes the sensors, and determine whether the set of vehicular measurements conforms to the motion data model based on, for example, comparing the of vehicular measurements against a set of expected values provided by the motion data model.

There are various ways by which the measurement data processing system can determine the conformance of the set of vehicular measurements to the motion data model. In some examples, the measurement data processing system can perform a conformance test between measurements of two physical attributes included in the set of vehicular measurements. The system can obtain, from the set of vehicular measurements, a first measurement corresponding to a first physical attribute of a pair physical attributes. The system can compute, based on the set mathematical relationships included in the motion data model, an expected measurement corresponding to a second physical attribute of the pair of physical attributes. The data processing system can also obtain, from the set of vehicular measurements, a second measurement corresponding to the second physical attribute, and compare the second measurement with the expected measurement to determine a difference output. If the difference output exceeds a first threshold, the data processing system can determine that either the first measurement or the second measurement (or both) of the set of vehicular measurements does not conform to the mathematical relationships and is potentially erroneous. The measurement data processing system can repeat the conformance test for measurements of different pairs of physical attributes, and can determine that the set of vehicular measurements contains at least one potentially erroneous measurement based on the difference output of at least one conformance test (for at least one measurement) exceeding the first threshold.

Based on the outcome of the conformance test for the vehicular measurements of different pairs of physical attributes, measurement data processing system can perform one or more actions with respect to the set of the vehicular measurements. In some examples, if the set of vehicular measurement contains at least one potentially erroneous measurement, the entire set can be discarded and not used for the operation of the vehicle. In some examples, measurement data processing system can also determine, for measurements of a pair of physical attributes that fail the conformance test, that a first measurement for a first one of the pair of physical attributes is more likely to be accurate than a second measurement for a second one of the pair of physical attributes, and keep the first measurement while replacing the second measurement with an expected value obtained from the motion data model. Such a determination can be based on various factors including, for example, the first measurement conforming to the motion data model when paired with the measurements of other physical attributes, a history of measurements of the first one of the pair of physical attributes, etc.

In some examples, the measurement data processing system may also perform least-squares estimations based on the set of mathematical relationships of the motion data model to determine a set of expected measurements corresponding to the set of vehicular measurements. For example, the measurement data processing system can determine the values of one or more parameters included in the set of mathematical relationships based on the set of vehicular measurements. The measurement data processing system can then apply the set of mathematical relationships including the determined values of the one or more parameters to the set of vehicular measurements to determine a set of corresponding expected measurements. The values of the one or more parameters can be updated, and the determination of the set of expected measurements can be repeated based on the updated parameters, to minimize a sum of squared differences between the set of vehicular measurements and the set of expected measurements. The minimized sum of squared difference (or a weighted sum of squared difference) can be compared against a second threshold and, if the sum exceeds the second threshold, the measurement data processing system can also determine that the set of vehicular measurements does not conform to the mathematical relationships and contain one or more potentially erroneous measurements. Based on the determination of nonconformance, the measurement data processing system may discard the entire set of vehicular measurements. In some examples, the measurement data processing system can also perform conformance test between measurements of pairs of physical attributes using the set of mathematical relationships with the updated parameters, and/or refer to a history of the measurements, to identify which of the measurement(s) are more likely to be accurate, and keep those measurement(s) while replacing other measurements deemed to be inaccurate with expected values obtained from the set of mathematical relationships.

Figure 3:
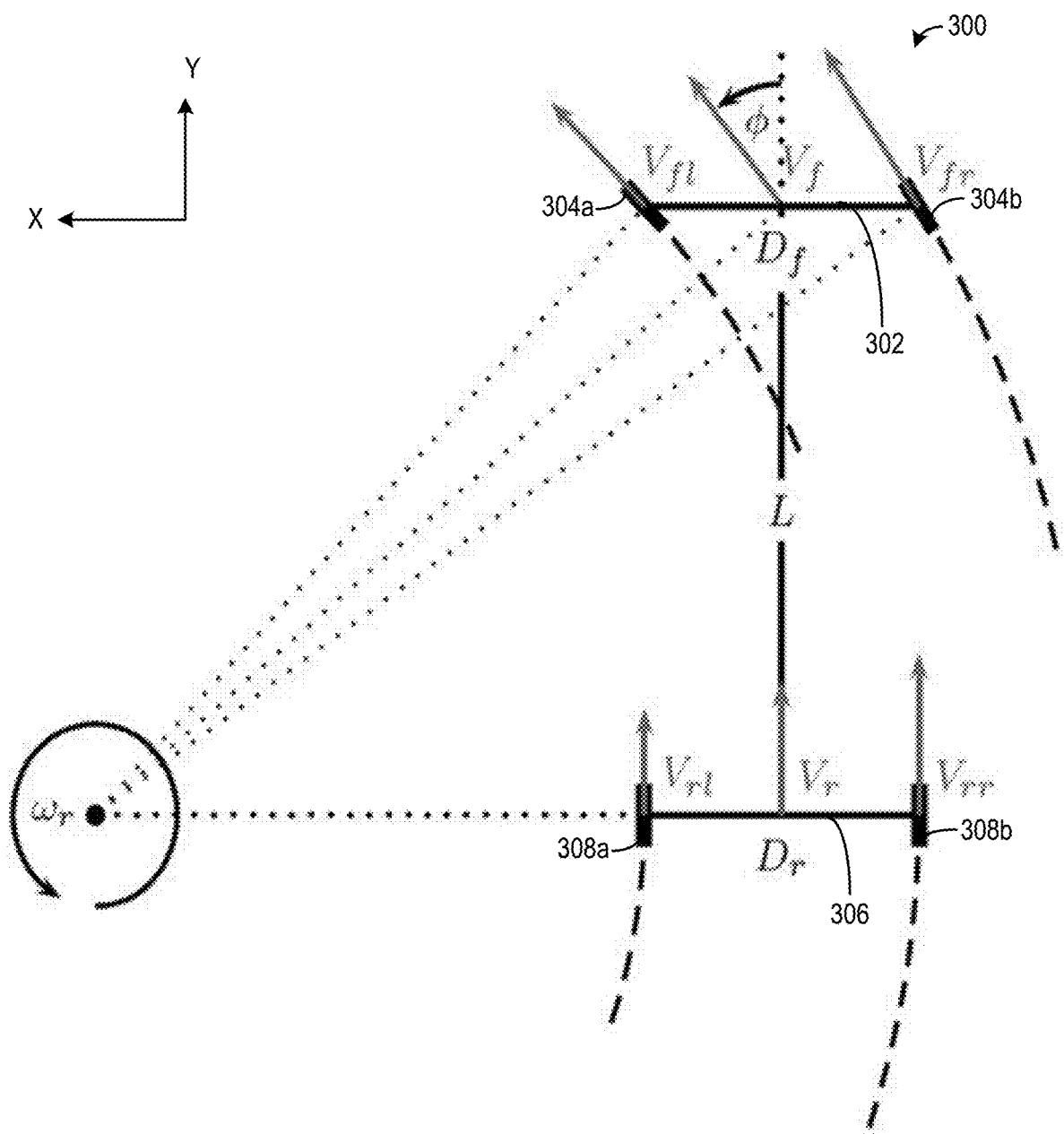
FIG. 3 illustrates an example of a set of physical quantities related to a vehicle in a motion according to embodiments of the present disclosure.

FIG. 3 illustrates a set of physical attributes/quantities of a vehicle in motion. The physical attributes can include one or more physical dimensions of vehicle 300, as well as orientations and state of motions (e.g., a rotational angle, a rotational speed, etc.) of different components of vehicle 300. In the example of FIG. 3, a vehicle 300 has a front wheel axis 302 coupled with a front left wheel 304a and a front right wheel 304b. Front left wheel 304a and front right wheel 304b are separated by a front track width $D_f$, which can be based on a physical dimension of the vehicle. Moreover, front left wheel 304a may have a rotational speed of $V_{fl}$, whereas front right wheel 304b may have a rotational speed of $V_{fr}$. Rear left wheel 308a and rear right wheel 308b are separated by a rear track width $D_r$, which can based on a physical dimension of vehicle 300. Rear left wheel 308a may have a rotational speed of $V_{rl}$, whereas rear right wheel 308b may have a rotational speed of $V_{rr}$. The rotational speeds of the front wheel pairs can be used to determine an average rotational speed $V_f$ of front wheel axis 302, whereas the rotational speeds of the rear wheel pairs can be used to determine an average rotational speed $V_r$ of rear wheel axis 306. Front wheel axis 302 and rear wheel axis 306 are separated by a wheel base distance L. In the example of FIG. 3, vehicle 300 was travelling along a Y direction but now is on the verge of making a turn towards left (e.g., the X direction) responsive to front left wheels 304a and 304b being steered towards left by a steering angle ϕ with respect to the Y direction.

The aforementioned physical attributes/quantities, including the steering angle and the rotational speeds, can be measured by the sensors (e.g., steering angle sensor 102 and wheel speed sensors 106a and 106b) to generate a set of vehicular measurements representing a state of motion of the vehicle at a given time. The set of vehicular measurements may include a steering angle measurement $y_\phi$ for the actual steering angle ϕ, a front left wheel speed measurement $y_{fl}$ for the actual rotational speed $V_{fl}$, a front right wheel speed measurement $y_{fr}$ for the actual rotational speed $V_{fr}$, a rear left wheel speed measurement $y_{rl}$ for the actual rotational speed $V_{rl}$, and a rear right wheel speed measurement $y_{rr}$ for the actual rotational speed $V_{rr}$. The sensors can perform the measurements at different times to generate different sets of vehicular measurements corresponding to different times.

In a case where vehicle 300 does not skid or slip when making the left turn, the measured rotational speeds for front left wheel 304a and front right wheel 304b, the measured the rotational speeds for rear left wheel 308a and rear right wheel 308b, as well as the measured steering angle can satisfy the following equations:

$$y_\phi = s_\phi \phi + b_\phi = z_\phi \qquad \text{(Equation 1)}$$

$$y_{rl} = s_{rl} V_r \left(1 - \left(\frac{D_r}{2L}\right)\tan\phi\right) + z_{rl} \qquad \text{(Equation 2)}$$

$$y_{rr} = s_{rr} V_r \left(1 + \left(\frac{D_r}{2L}\right)\tan\phi\right) + z_{rr} \qquad \text{(Equation 3)}$$

$$y_{fl} = s_{fl} V_r \sqrt{\left(1 - \left(\frac{D_f}{2L}\right)\tan\phi\right)^2 + \tan^2\phi} + z_{fl} \qquad \text{(Equation 4)}$$

$$y_{fr} = s_{fr} V_r \sqrt{\left(1 + \left(\frac{D_f}{2L}\right)\tan\phi\right)^2 + \tan^2\phi} + z_{fr} \qquad \text{(Equation 5)}$$

For example, based on Equation 1, the steering angle measurement $y_\phi$ can be related to the actual steering angle $\phi$ based on a scaling factor $s_\phi$, a bias term $b_\phi$, and a measurement noise term $z_\phi$. Moreover, based on Equations 2, 3, 4, and 5, a measured rotational speed for a wheel (e.g., $y_{rl}$) can be related to the actual rotational speed of rear wheel axis 306 ($V_r$) based on a scaling factor (e.g., $s_{rl}$), a term including a tangent of the actual steering angle $\phi$ and a ratio between the front ($D_f$) or rear ($D_r$) track width and the wheel base length (L), and a measurement noise term (e.g., $z_{rl}$).

In some examples, each scaling factor and bias term can be pre-determined independently in a calibration process. Moreover, physical attributes such as front ($D_f$) or rear ($D_r$) track width and wheel base length (L) can also be measured during or prior to the calibration process. For example, vehicle 300 can be put through a sensor calibration process in which vehicle 300 can be steered at different known steering angles at different times. The steering angle measurements provided by steering angle sensor 102 can be collected at those times and compared with the known steering angles to determine the scaling factor $s_\phi$ and bias term $b_\phi$ of Equation 1. Moreover, vehicle 300 can also be controlled to drive in a straight line (e.g., with zero steering angle) at different speeds to determine the scaling factors $s_{rl}$, $s_{rr}$, $s_{fl}$, and $s_{fr}$ of Equations 2-5. The calibration process can be performed when, for example, vehicle 300 is manufactured, different components of the vehicle (e.g., the axles) are replaced, etc. In some examples, the scaling factors can also be estimated and updated during an operation of vehicle 300 and based on outputs from other sensors (e.g., IMU 110). For example, the scaling factor $s_\phi$ and/or the bias term $b_\phi$ for steering angle can be updated based on a measurement of a direction of motion of vehicle 300 provided by the gyroscopes of IMU 110, whereas the scaling factors $s_{rl}$, $s_{rr}$, $s_{fl}$, and $s_{fr}$ can be updated based on a measurement of a linear speed of vehicle 300, which can be used to estimate the average rotational speed of rear wheel axis $V_r$. On the other hand, the noise terms can be determined based on, for example, determining a statistical variance for each of the measurements accumulated over a pre-determined period of time.

A motion data model comprising Equations 1-5 can be used to detect whether a set of vehicular measurements comprising steering angle measurement $y_\phi$ and wheel speed measurements $y_{rl}$, $y_{fr}$, $y_{rr}$, and $y_{rl}$ include potentially erroneous measurements. For example, a determination of whether the set of vehicular measurements conforms to Equations 1-5 can be made. In some examples, as discussed above, one or more expected measurements can be computed using Equations 1-5 and based on some of the vehicular measurements provided by the sensors. A conformance test can be performed between measurements of a pair of physical attributes. For example, a first measurement of a first physical attribute can be used to determine an expected value of a second physical attribute using one or more of Equations 1-5, and the expected value can be compared against a second measurement of the second physical attribute within the same set of vehicular measurements. If the expected value matches the second measurement (or where the difference is below a first threshold), it can be determined that the first measurement and the second measurement pass the conformance test.

As an illustrative example, Equation 1 can be used to compute an expected steering angle $\hat{\phi}$ based on the steering angle measurement $y_\phi$, scaling factor $s_\phi$, and bias term $b_\phi$ as follows:

$$\hat{\phi} = \frac{y_\phi - b_\phi}{s_\phi} \qquad \text{(Equation 6)}$$

Moreover, Equations 2 and 3 can be combined to compute an expected average rotational speed $\hat{V}_r$ of rear wheel axis 306 as follows:

$$\hat{V}_r = 0.5\left(\frac{y_{rl}}{s_{rl}} + \frac{y_{rr}}{s_{rr}}\right) \qquad \text{(Equation 7)}$$

The expected steering angle $\hat{\phi}$ and the expected average rotational speed $\hat{V}_r$ can be fed into Equations 4 and 5 to compute an expected forward left wheel rotational speed $\hat{y}_{fl}$ and an expected forward right wheel rotation speed $\hat{y}_{fr}$ as follows:

$$\hat{y}_{fl} = s_{fl} \hat{V}_r \sqrt{\left(1 - \left(\frac{D_f}{2L}\right)\tan\hat{\phi}\right)^2 + \tan^2\hat{\phi}} \qquad \text{(Equation 8)}$$

$$\hat{y}_{fr} = s_{fr} \hat{V}_r \sqrt{\left(1 + \left(\frac{D_f}{2L}\right)\tan\hat{\phi}\right)^2 + \tan^2\hat{\phi}}. \qquad \text{(Equation 9)}$$

The expected forward left wheel rotational speed $\hat{y}_{fl}$ can be compared against the forward left wheel rotational speed $y_{fl}$ provided by the sensor to compute a difference. If the absolute value of difference exceeds a pre-determined threshold, it can be determined that the set of vehicular measurements including $y_{fl}$ does not conform to the model represented by Equations 1-5 regardless of whether the difference for other measurements is below the pre-determined threshold. Similarly, the expected forward right wheel rotational speed $\hat{y}_{fr}$ can also be compared against the forward right wheel rotational speed $y_{fr}$ provided by the sensor to compute a difference, and if the absolute value of difference exceeds the pre-determined threshold, it can also be determined that the set of vehicular measurements including $y_{fr}$ does not conform to the model represented by Equations 1-5. In some embodiments, the entire set of vehicular measurements can be discarded based on the non-conformance determination. In some embodiments, as to be described in more details more, a subset of the set of vehicular measurements can be determined to be more likely to be accurate and can be retained to control a vehicle operation.

In some embodiment, the conformance test of the set of vehicular measurements can be performed in a two-step process. As a first step, conformance test can be made for the steering angle measurement ($y_\phi$) and the rear wheel speeds measurements ($y_{rr}$ and $y_{rl}$) with respect to Equations 1, 2, and 3. For example, based on the steering angle measurement $y_\phi$, expected steering angle $\hat{\phi}$ can be determined based on Equation 6. Moreover, an expected average rotational speed $\hat{V}_r$ can be determined based on rear wheel speeds measurements $y_{rr}$ and $y_{rl}$ and based on Equations 7. Expected rear wheel speeds measurements $\hat{y}_{rr}$ and $\hat{y}_{rl}$ can be determined based on expected steering angle and expected average rotational speed $\hat{V}_r$ based on Equations 2 and 3 described above (rewritten into Equations 10 and 11 below):

$$\hat{y}_{rl} = s_{rl}\hat{V}_r\left(1 - \left(\frac{D_r}{2L}\right)\tan\hat{\phi}\right) + z_{rl} \qquad \text{(Equation 10)}$$

$$\hat{y}_{rr} = s_{rr}\hat{V}_r\left(1 + \left(\frac{D_r}{2L}\right)\tan\hat{\phi}\right) + z_{rr} \qquad \text{(Equation 11)}$$

Rear wheel speeds measurements $y_{rr}$ and $y_{rl}$ can be compared against the expected rear wheel speeds measurements $\hat{y}_{rr}$ and $\hat{y}_{rl}$ for a conformance test between, for example, a steering angle measurement (reflected in the expected steering angle $\hat{\phi}$) and a right rear wheel speed measurement $y_{rr}$, and for a conformance test between steering angle measurement and left rear wheel speed measurement $y_{rl}$. If the conformance tests pass, the measurement values can be used to obtain the expected steering angle $\hat{\phi}$ and expected average rotational speed $\hat{V}_r$, and Equations 8 and 9 can be used to perform conformance test of forward wheel rotational speeds $y_{fl}$ and $y_{fr}$.

In some embodiments, the conformance tests can be performed by pairing a physical attribute with different physical attributes to determine, in the event that when any one of the conformance test fails, which of the measurement(s) are more likely to be accurate and can be used for vehicle operations. For example, in a case where the expected steering angle $\hat{\phi}$ is zero, which indicates that vehicle 300 is traveling in a straight line, forward wheel rotational speed measurements $y_{fl}$ and $y_{fr}$, as well as rear wheel rotational speed measurements rear wheel rotational speed measurements $y_{rl}$ and $y_{rr}$, can be checked to see if they are consistent with vehicle 300 traveling in a straight line. For example, for vehicle 300 to be travelling in a straight line, the rotational speeds between each pair of wheels should be identical. If one of the wheel pairs (e.g., the rear wheels) have identical rotational speed but not the other one (e.g., the front wheels), it can be determined that the steering angle measurement and the rear wheels speed measurement are more likely to be accurate and can be used to control the vehicle operation, while the rear wheel speeds can be discarded (and can be replaced with the front wheel speeds) to control the vehicle operation.

As another example, a conformance test can also be performed between a pair of expected steering angle $\hat{\phi}$ and front wheel rotational speed measurements ($y_{fl}$ and $y_{fr}$) without involving the rear wheel rotational speed measurements ($y_{rl}$ and $y_{rr}$), as follows:

$$\frac{\hat{y}_{fl}}{\hat{y}_{fr}} = \frac{s_{fl}\sqrt{\left(1 - \left(\frac{D_f}{2L}\right)\tan\hat{\phi}\right)^2 + \tan^2\hat{\phi}}}{s_{fr}\sqrt{\left(1 + \left(\frac{D_f}{2L}\right)\tan\hat{\phi}\right)^2 + \tan^2\hat{\phi}}} \qquad \text{(Equation 12)}$$

Equation 12 can be derived based on a ratio between Equations 8 and 9 to eliminate $\hat{V}_r$ (expected average rotational speed) which is determined based on rear wheel speeds measurements $y_{rr}$ and $y_{rl}$. Based on Equation 12, a ratio of expected front wheel rotational speed measurements $$\frac{\hat{y}_{fl}}{\hat{y}_{fr}}$$

can be determined, which can be compared against a ratio of rear wheel rotational speed measurements $$\frac{y_{fl}}{y_{fr}}.$$

The comparison result can indicate whether the steering angle measurement and the front wheel rotational speed measurements conform to the motion data model. If they are, while the rear wheel rotational speed measurements do not match the expected rear wheel rotational speeds (e.g., obtained from Equations 10 and 11), it can be determined that most likely the rear wheel rotational speed measurements are erroneous and should be discarded, while the steering angle measurement and the front wheel rotational speed measurements can be used to control the vehicular operation. In such example, a set of replacement measurements can be generated for the rear wheel rotational speed measurements based on the steering angle measurement and the front wheel rotational speed measurements. For example, referring back to Equations 8 and 9, an expected average rotational speed $\hat{V}_r$ can be computed based on the steering angle measurement $\phi$ and the front wheel rotational speed measurements ($y_{fl}$ and $y_{fr}$). The expected average rotational speed $\hat{V}_r$ and the steering angle measurement $\phi$ can be used to calculate the expected wheel rotational speed measurements for the rear wheels $\hat{y}_{rr}$ and $\hat{y}_{rl}$ based on Equations 10 and 11.

In some embodiments, historical measurements can also be used to determine, in the event that when any one of the conformance test fails, which measurements of a current set of vehicular measurement(s) are more likely to be accurate and can be used for vehicle operations. The historical measurements can be used to reflect a prior state of movement of vehicle 300, and current measurements that are consistent with the prior state of movement may be determined to be more likely to be accurate. As an illustrative example, if the historical measurements indicate that vehicle 300 was making a turn with a certain steering angle just prior to the current set of vehicular measurements was obtained, it is more likely that the current steering angle should remain the same. In the event that the current set of vehicular measurements fail the conformance tests, and if the current steering angle measurement is identical to the most recent prior steering angle measurement, it can be determined that the current steering angle measurement is more likely to be accurate and can be retained to determine the expected measurement values for other physical attributes (e.g., front wheel rotational speeds). In some embodiments, a weighted running average of a measurement can be maintained, with more recent measurements having a higher weight than less recent measurements, and the weighted running average can be used to judge whether a measurement is more likely to be accurate than the other measurements when conformance tests fail.

In some embodiments, a least-squares estimation can also be performed based on Equations 1-5 to determine a set of expected measurements corresponding to the set of vehicular measurements. For example, using least-squares estimation, values of expected steering angle $\hat{\phi}$ and expected average rotational speed $\hat{V}_r$ that minimize a sum of square of differences between each of expected steering angle measurement and wheel rotational speed measurements $\hat{y}_\phi$, $\hat{y}_{fl}$, $\hat{y}_{fr}$, $\hat{y}_{rl}$, and $\hat{y}_{rr}$ and the corresponding steering angle measurement and wheel rotational speed measurements $y_\phi$, $y_{fl}$, $y_{fr}$, $y_{rl}$, and $y_{rr}$ can be determined. In some examples, instead of a sum of squared differences, a weighted sum of squared differences can be used to guide the least-squares estimation. For example, the squared difference between each of expected steering angle measurement and wheel rotational speed measurements $\hat{y}_\phi$, $\hat{y}_{fl}$, $\hat{y}_{fr}$, $\hat{y}_{rl}$, and $\hat{y}_{rr}$ and the corresponding steering angle measurement and wheel rotational speed measurements $y_\phi$, $y_{fl}$, $y_{fr}$, $y_{rl}$, and $y_{rr}$ can be weighted based on the associated noise terms $z_\phi$, $z_{fl}$, $z_{fr}$, $z_{rl}$, and $z_{rr}$, with a lower weight assigned for a larger noise term. For example, a value that is inversely proportional to the variance of the measurement can be used as a weight. If the sum of the squared differences (or the weighted sum of the squared differences) exceeds a pre-determined threshold, it can be determined that the set of vehicular measurements does not conform to the model represented by Equations 1-5.

Figure 4:
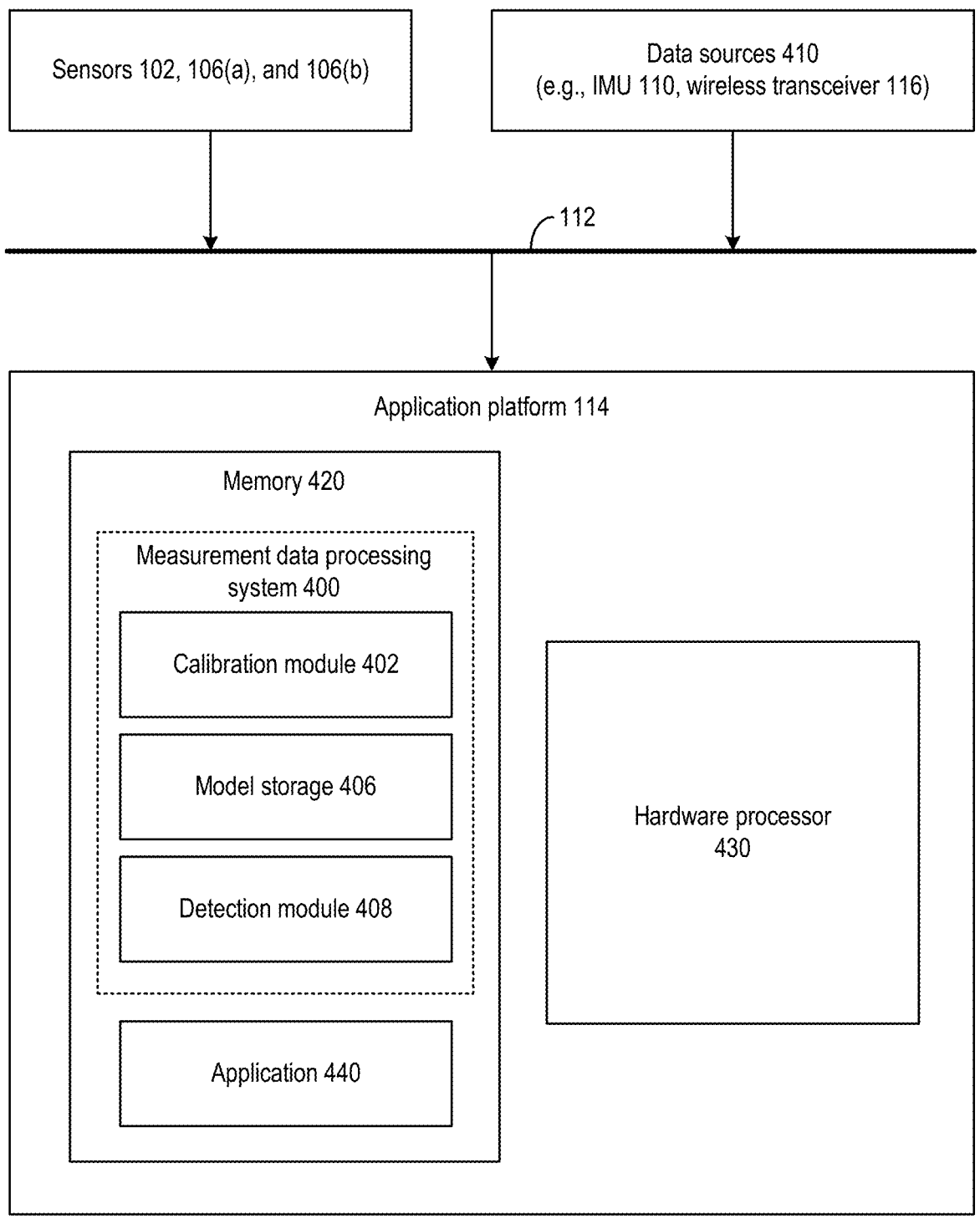
FIG. 4 illustrates an example of a processing system of vehicular measurement data according to embodiments of the present disclosure.

FIG. 4 illustrates an example of a measurement data processing system 400 according to embodiments of the present disclosure. Measurement data processing system 400 may include a set of software modules including a calibration module 402, a model storage 406, and a detection module 408. Measurement data processing system 400 can be stored and executed by application platform 114. For example, application platform 114 may include a memory 420 to store the software modules of measurement data processing system 400, and a hardware processor 430 to execute measurement data processing system 400. Hardware processor 430 may include, for example, an application specific integrated circuits (ASICs), a general-purpose processor configured to execute a set of instructions, and/or other processing structure or means. Memory 420 further stores an application 440 which can be executed by hardware processor 430 to control a vehicle operation (e.g., an navigation operation, an autonomous driving operation, etc.). Hardware processor 430 can execute measurement data processing system 400 to perform conformance tests on a set of vehicular measurement sensor data obtained from sensors (e.g., steering angle sensor 102, wheel speed sensors 106a and 106b, etc.) via network 112 and, based on the conformance tests results, provide the set of vehicular measurement sensor data or other data to application 440 to control the vehicle operation. In a case where the set of vehicular measurement sensor data fail the conformance tests, measurement data processing system 400 can obtain data from data sources 410 (e.g., IMU 110, wireless transceiver 116, etc.) via network 112 and provide the data from data sources 410 to application 440 to control the vehicle operation.

Calibration module 402 may determine a motion data model that defines a set of mathematic relationships (e.g., Equations 1-9) among a set of physical quantities (e.g., actual steering angle $\phi$ and wheel rotational speed measurements $y_{fl}$, $y_{fr}$, $y_{rl}$, and $y_{rr}$) of a vehicle in motion. Calibration module 402 may determine one or more parameters (e.g., scaling factors $s_\phi$, $s_{rl}$, $s_{rr}$, $s_{fl}$, and $s_{fr}$ and bias term $b_\phi$) for the motion data model during the aforementioned calibration process or during the operation of the vehicle. In some embodiments, calibration module 402 can set measurement data processing system 400 in a calibration mode where data processing system 400 can forward sets of vehicular measurement data (obtained at different times) to calibration module 402 to determine the parameters. During the calibration mode, the sets of vehicular measurement data may be retained in measurement data processing system 400 and not forwarded to application platform 114. The determination of the parameters can be based on a curve-fitting process. Upon completion of the calibration process (e.g., when the parameters converge over a pre-determined number of sets of vehicular measurement), the parameters can be stored as part of the model in model storage 406.

Detection module 408 can perform conformance tests to detect potentially erroneous vehicular measurement data using the model stored in model storage 406 and based on the techniques described above. For example, detection module 408 can compute one or more expected measurements according to Equations 8-12 and based on some of the vehicular measurements provided by sensors 102 and 106. As part of the conformance tests, the expected measurements can be compared against the corresponding sensor measurements to determine a difference. If the absolute value of the difference is below a threshold, detection module 408 can determine that the set of vehicular measurements provided by the sensors conforms to the model represented by Equations 1-5. If the absolute value exceeds the threshold, detection module 408 can determine that the set of vehicular measurements provided by the sensors does not conform to the model of Equations 1-5. In some embodiments, detection module 408 can perform the conformance tests by pairing a physical attribute with different physical attributes to determine, in the event that when any one of the conformance test fails, which of the measurement(s) are more likely to be accurate and can be used for vehicle operations. Detection module 408 can also maintain historical measurements (e.g., a weighted running average for each of the set of vehicular measurements) and, in a case where the conformance tests fail, determine which of the set of vehicular measurements can be retained based on how the set of vehicular measurements match with their weighted running averages, as described above.

As another example, detection module 408 can perform a least-squares estimation based on Equations 1-5 to determine a set of expected measurements corresponding to the set of vehicular measurements. A sum (or a weighted sum) of difference between each of the set of vehicular measurements and their corresponding expected value can be minimized using the a least-squares estimation. If the absolute value of the minimized difference is below a threshold, detection module 408 can determine that the set of vehicular measurements provided by the sensors conforms to the model represented by Equations 1-5. If the absolute value exceeds the threshold, detection module 408 can also determine that the set of vehicular measurements provided by the sensors does not conform to the model represented by Equations 1-5.

If the actual sensor measurements conform to the model, measurement data processing system 400 can forward the sensor measurement data to application platform 114 to perform one or more operations of the vehicle such as those described in FIG. 2A and FIG. 2B. For example, referring to FIG. 2A, the steering angle and the rotation speed can be used to determine a current location of the vehicle for a navigation system. A displacement (in terms of a travel direction and a travel distance) of the vehicle within a time period between a current time and a prior time when the vehicle was at the last known location can be determined. The displacement can be added to the last known location to determine the current location of the vehicle. As another example, referring to FIG. 2B, an autonomous driving system can control the steering and engine/motor power of a vehicle to control the vehicle to reach a pre-determined target location at a pre-determined time. The autonomous driving system can update an estimate of the current location of the vehicle based on the steering angle and rotation speed measurement data provided by data processing system 400 to update the location estimation, and control the steering and/or the engine/motor power of the vehicle based on the updated location estimation.

On the other hand, if the actual sensor measurements does not conform to the model, measurement data processing system 400 may perform other actions. For example, the measurement data processing system 400 may withhold the data from application 440. Measurement data processing system 400 can obtain a new set of vehicular measurement data (provided by the sensors at a subsequent time), and forward the new set of vehicular measurement data to application 440 if the new set of vehicular measurement data conforms to the model. The measurement data processing system may also procure measurement data from other sources (e.g., IMU 110) and provide the measurement data to application platform 114 in place of the erroneous vehicular measurements. As another example, measurement data processing system 400 can also retain a subset of the set of vehicular measurement data that are determined to more likely accurate (e.g., based on conformance tests, historical average, etc.), use the retained the subset to calculate expected measurements as replacement measurement data to replace the rest of set of vehicular measurement data, and forward the retained subset of vehicular measurement data and the replacement measurement data to application 440.

As another example, measurement data processing system 400 may also forward the data together with an indication that the data contain one or more potentially erroneous vehicular measurements to the controller, which can then decide how to handle the data based on the indication. For example, the controller may procure data from other data sources (e.g., cell tower 118 and/or satellite 120), another set of measurement data from sensors 102 and 106 obtained at a different time point, etc., as described above.

Figure 5:
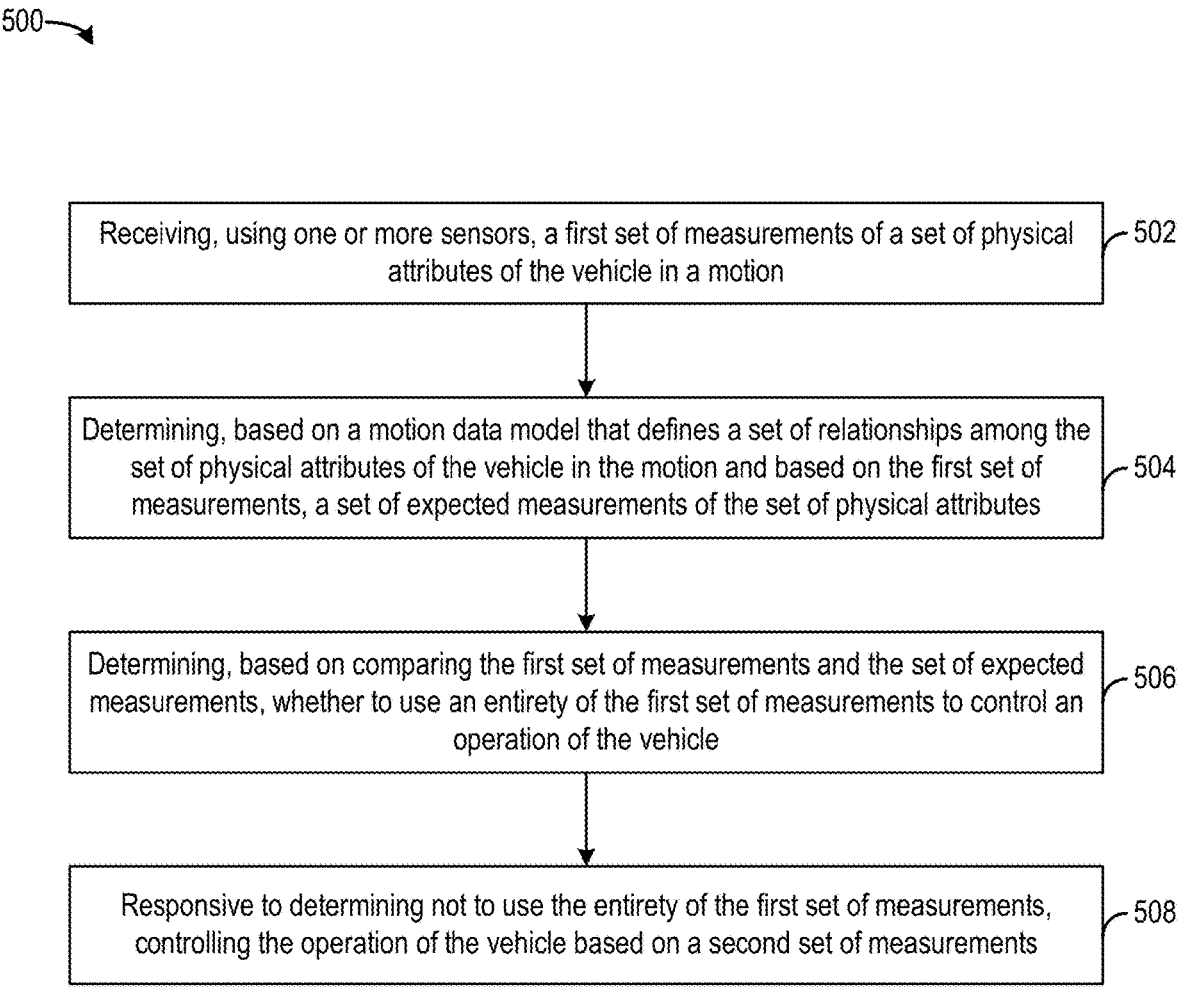
FIG. 5 illustrates an example of operating a vehicle according to embodiments of the present disclosure.
Figure 6:
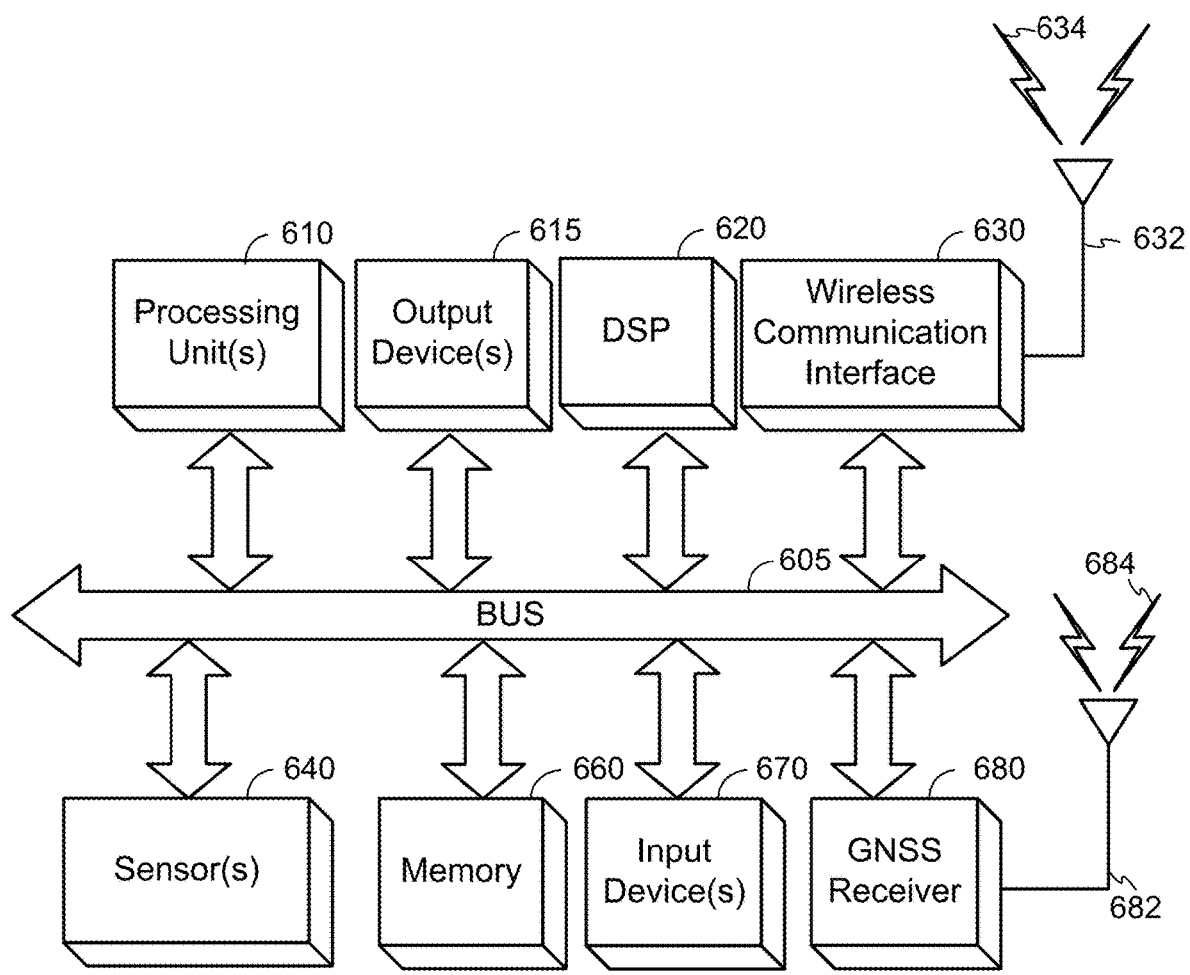
FIG. 6 illustrates an example of a computer system that can be used to implement techniques disclosed herein.

FIG. 5 is a flow diagram illustrating a method 500 of controlling a vehicle, according to embodiments of the present disclosure. According to some embodiments, functionality of one or more blocks illustrated in FIG. 5 may be performed by one or more electronic components of a vehicle (e.g., measurement data processing system 400 and application platform 114). Means for performing these functions may include software and/or hardware components of measurement data processing system 400 and application platform 114, as illustrated in FIG. 6 and described in more detail below.

At block 502, the functionality includes receiving, from one or more sensors, a first set of measurements of the set of physical attributes of a vehicle in motion. The one or more sensors may include, for example, steering angle sensor 102 and wheel speed sensors 106, and the first set of measurements may be received from a CAN bus. The set of physical attributes may include, for example, actual steering angle $\phi$ and wheel rotational speed measurements for each wheel including $y_{fl}$, $y_{fr}$, $y_{rl}$, and $y_{rr}$. The first set of measurements may include, for example, steering angle measurement $y_\phi$ and wheel rotational speed measurements for each wheel including $y_{fl}$, $y_{fr}$, $y_{rl}$, and $y_{rr}$. The measurements can be based on, for example, images of a set of patterns on a circumference of a steering column for steering angle measurement, images of a marker on a wheel shaft for wheel rotational speed measurement, a quantity of electric current supplied to an electric motor that drives the wheel shaft for wheel rotational speed measurement, etc. Means for performing these functions may include software and/or hardware components of measurement data processing system 400 including steering angle sensor 102, wheel speed sensors 106, and detection module 408 of FIG. 4, as well as sensor(s) 640 and processing unit(s) 610 of FIG. 6 as described in more detail below.

At block 504, the functionality includes determining, based on a motion data model that defines a set of relationships among the set of physical attributes of the vehicle in the motion and based on the first set of measurements, a set of expected measurements of the set of physical attributes. The set of relationships may include, for examples, Equations 1-5 as described above. The determination can include, for example, computing expected measurements according to Equations 8-12 and based on some of the vehicular measurements provided by sensors 102 and 106. The determination can also include, for example, performing a least-squares estimation based on, for example, Equations 1-5 as described above to determine the set of expected measurements corresponding to the first set of measurements. A sum of squared differences between the set of expected measurements and the first set of measurements can be minimized using least-squares estimation. Means for performing these functions may include software and/or hardware components of measurement data processing system 400 such as detection module 408 as illustrated in FIG. 4, as well as processing unit(s) 610 of FIG. 6 as described in more detail below.

At block 506, the functionality includes determining, based on comparing the first set of measurements and the set of expected measurements, whether to use an entirety of the first set of measurements to control an operation of the vehicle. In some embodiments, the determination may include comparing the expected measurements (obtained at block 504) against the corresponding sensor measurements to determine an absolute difference for each measurement, and comparing the absolute difference against a first threshold. The absolute difference can indicate whether a measurement provided by the sensors conforms to, for example, the model represented by Equations 1-5 as described above. If the absolute difference between any of the expected measurements and any of the corresponding sensor measurements exceeds the first threshold, it can be determined that the first set of measurements does not conform (or have a low degree of conformance) to the motion data model, and the entirety of the first set of measurements is not to be used to control an operation of the vehicle. In some embodiments, in a case where least-squares estimation is used to minimize a sum of squared differences between the set of expected measurements and the first set of measurements, the conformance to the model can be determined based on the minimized sum of squared differences exceeds a second threshold. If the minimized sum of squared differences exceeds the second threshold, it can also be determined that the first set of measurements does not conform to the motion data model, and the entirety of the first set of measurements is not to be used to control an operation of the vehicle. In some embodiments, the operation of the vehicle may include a navigation operation to estimate a location of the vehicle, a direction of motion of the vehicle, a speed of the vehicle along that direction, or any combination thereof. In some embodiments, the operation of the vehicle comprises an autonomous driving operation to adjust a direction of motion of the vehicle, a speed of the vehicle, or any combination thereof. Means for performing these functions may include software and/or hardware components of measurement data processing system 400 such as detection module 408 as illustrated in FIG. 4, as well as processing unit(s) 610 of FIG. 6 as described in more detail below.

At block 508, the functionality includes controlling the operation of the vehicle based on a second set of measurements. The second set of measurements may be for the same set of physical quantities but obtained at a different time, or procured from other data sources. The second set of measurements may also include, for example, a subset of the first set of measurements determined to be more likely to be accurate based on the techniques described above. Means for performing these functions may include software and/or hardware components of measurement data processing system 400 and application platform 114 of FIG. 4, as well as processing unit(s) 610, output device(s) 615, wireless communication interface 630, sensor(s) 640, and GNSS receiver 680 of FIG. 6 as described in more detail below. Means for performing these functions may include software and/or hardware components of measurement data processing system 400 such as detection module 408 as illustrated in FIG. 4, as well as processing unit(s) 610 of FIG. 6 as described in more detail below.

FIG. 6 illustrates an embodiment of a computer system 600, which may be utilized and/or incorporated into one or more electronic components of a vehicle (e.g., application platform 114 of FIG. 1). Computer system 600 can also be incorporated in a mobile device (e.g., a smart phone, a tablet, etc.). FIG. 6 provides a schematic illustration of one embodiment of a computer system 600 that can perform the methods provided by various other embodiments, such as the method described in relation to FIG. 5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 5. The computer system 600 also can include one or more input devices 615, which can include without limitation a mouse, a keyboard, a camera, a microphone, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 may also include a communications subsystem 630, which can include support of wireline communication technologies and/or wireless communication technologies (in some embodiments) managed and controlled by a wireless communication interface 633. The communications subsystem 630 may include a modem, a network card (wireless or wired), an infrared communication device, a wireless communication device, and/or a chipset, and/or the like. The communications subsystem 630 may include one or more input and/or output communication interfaces, such as the wireless communication interface 633, to permit data to be exchanged with a network, mobile devices, other computer systems, and/or any other electronic devices described herein.

In many embodiments, the computer system 600 will further comprise a working memory 635, which can include a RAM and/or or ROM device. Software elements, shown as being located within the working memory 635, can include an operating system, device drivers, executable libraries, and/or other code, such as application(s), which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 5, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

According to some examples, an apparatus for controlling a vehicle is provided. The apparatus comprises a memory that stores a set of instructions and a motion data model that defines a set of relationships among a set of physical attributes of the vehicle in a motion. The apparatus further comprises a hardware processor configured to execute the set of instructions to: receive, from one or more sensors, a first set of measurements of the set of physical attributes of the vehicle in the motion; determine, based on the motion data model and the first set of measurements, a set of expected measurements of the set of physical attributes; determine, based on comparing the first set of measurements and the set of expected measurements, whether to use an entirety of the first set of measurements to control an operation of the vehicle; and responsive to determining not to use the entirety of the first set of measurements, control the operation of the vehicle based on a second set of measurements.

In some examples, the set of physical attributes includes an orientation of a first component of the vehicle in the motion and a rotational speed of a second component of the vehicle in the motion. In some examples, the first set of measurements comprises a first measurement of a steering angle of the vehicle, a second measurement a first rotational speed of a left front wheel of the vehicle, a third measurement of a second rotational speed of a right front wheel of the vehicle, a fourth measurement of a third rotational speed of a left rear wheel of the vehicle, and a fifth measurement of a fourth rotational speed of a right rear wheel of the vehicle. The motion data model defines: a first relationship between the steering angle of the vehicle and the first rotational speed of the left front wheel of the vehicle; a second relationship between the steering angle of the vehicle and the second rotational speed of the right front wheel of the vehicle; a third relationship between the steering angle of the vehicle and the third rotational speed of the left rear wheel of the vehicle; a fourth relationship between the steering angle of the vehicle and the fourth rotational speed of the right rear wheel of the vehicle; or any combination thereof.

In some examples, determining, based on a motion data model that defines a set of relationships among the set of physical attributes of the vehicle in a motion and based on the first set of measurements, a set of expected measurements of the set of physical attributes comprises the hardware processor being configured to execute the set of instructions to: determine an expected steering angle based on the first measurement of the steering angle; determine an expected first rotational speed of the left front wheel based on the expected steering angle and the first relationship; and determine whether the first set of measurements conforms to the motion data model based on comparing the expected first rotational speed against the second measurement of the first rotational speed.

In some examples, determining, based on a motion data model that defines a set of relationships among the set of physical attributes of the vehicle in a motion and based on the first set of measurements, a set of expected measurements of the set of physical attributes comprises the hardware processor being configured to execute the set of instructions to: determine an expected steering angle based on the first measurement of the steering angle; determine an expected second rotational speed of the right front wheel based on the steering angle and the second relationship; and determine whether the first set of measurements conforms to the motion data model based on comparing the expected second rotational speed against the third measurement of the second rotational speed.

In some examples, determining, based on a motion data model that defines a set of relationships among the set of physical attributes of the vehicle in a motion and based on the first set of measurements, a set of expected measurements of the set of physical attributes comprises the hardware processor being configured to execute the set of instructions to: determine an average rotational speed of the left rear wheel and the right rear wheel based on the fourth measurement of the third rotational speed of the left rear wheel and the fifth measurement of the fourth rotational speed of the right rear wheel; and determine the expected first rotational speed of the left front wheel based on the expected steering angle, the first relationship, and the average rotational speed.

In some examples, determining, based on a motion data model that defines a set of relationships among the set of physical attributes of the vehicle in a motion and based on the first set of measurements, a set of expected measurements of the set of physical attributes comprises the hardware processor being configured to execute the set of instructions to: determine whether the expected steering angle and the fourth measurement of the third rotational speed of the left rear wheel conform to the third relationship; and responsive to determining that the expected steering angle and the fourth measurement of the third rotational speed of the left rear wheel conform to the third relationship, determine the expected first rotational speed of the left front wheel based on the expected steering angle and the first relationship.

In some examples, determining, based on a motion data model that defines a set of relationships among the set of physical attributes of the vehicle in a motion and based on the first set of measurements, a set of expected measurements of the set of physical attributes comprises the hardware processor being configured to execute the set of instructions to: determine whether the expected steering angle and the fifth measurement of the fourth rotational speed of the right rear wheel conform to the fourth relationship; and responsive to determining that the expected steering angle and the fifth measurement of the fourth rotational speed of the right rear wheel conform to the fourth relationship, determine the expected first rotational speed of the left front wheel based on the expected steering angle and the first relationship.

In some examples, the hardware processor is configured to execute the set of instructions to: determine, based on comparing the first set of measurements and the set of expected measurements, that a first subset of the first set of measurements is to be used to control the operation of the vehicle; and include the first subset of the first set of measurements in the second set of measurements.

In some examples, the hardware processor is configured to execute the set of instructions to: determine that the first measurement of the steering angle and the second measurement the first rotational speed of the left front wheel conform to the first relationship; determine that the first measurement of the steering angle and the fourth measurement the third rotational speed of the left rear wheel does not conform to the third relationship; and include the first measurement and the second measurement in the second set of measurements.

In some examples, the hardware processor is configured to execute the set of instructions to: determine a replacement measurement of the third rotational speed of the left rear wheel based on the first measurement of the steering angle and the second measurement of the first rotational speed of the left front wheel; and include the replacement measurement in the second set of measurements.

In some examples, the hardware processor is configured to execute the set of instructions to: maintain a historical average of the first measurement; determine that a current first measurement of the steering angle and the second measurement the first rotational speed of the left front wheel do not conform to the first relationship; determine that current first measurement matches the historical average of the first measurement; and based on determining that the current first measurement matches with the historical average, include the current first measurement in the second set of measurements.

In some examples, determining whether the first set of measurements conforms to the motion data model comprises the hardware processor being configured to execute the set of instructions to: determine a difference between each measurement of the set of expected measurements and each corresponding measurement of the first set of measurements; assign a weight to each difference based on a variance of the each of the first set of measurements; determine a weighted sum of the differences; update the set of expected measurements to minimize the weighted sum of the differences; and determine whether the first set of measurements conforms to the motion data model based on whether the minimized weighted sum of the differences exceeds a threshold.

In some examples, the first set of measurements is obtained at first time; and wherein the second set of measurements is of the set of physical attributes obtained at second time. In some examples, the second set of measurements is of a different set of physical attributes comprising a location of the vehicle. In some examples, the second set of measurements is obtained via: an inertial measurement unit (IMU), a wireless receiver, or any combination thereof.

In some examples, the motion data model further includes: track widths of the vehicle, a wheel base distance of the vehicle, or any combination thereof. The set of relationships are defined based on a calibration process that precedes the motion.

In some examples, the operation of the vehicle comprises a navigation operation to estimate a location of the vehicle, or a direction of motion of the vehicle, or a speed of the vehicle along that direction. In some examples, the operation of the vehicle comprises an autonomous driving operation to adjust at least one of: a direction of motion of the vehicle or a speed of the vehicle.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of controlling a vehicle, the method being performed by a hardware processor of the vehicle and comprising:
   receiving, from one or more sensors of the vehicle, a first set of measurements of a steering angle and rotational speeds of four wheels of the vehicle in a motion;
   obtaining calibration parameters for a steering angle sensor of the one or more sensors, wherein the calibration parameters include a scaling factor, a bias term, and a noise term;
   based on a motion data model that defines a set of relationships among the steering angle and the rotational speeds of the four wheels of the vehicle, and based on the first set of measurements:
   determining an expected steering angle based on a first measurement of the steering angle of the first set of measurements, wherein determining the expected steering angle comprises applying the calibration parameters to the first measurement of the steering angle of the first set of measurements,
   determining an expected average rotational speed of a left rear wheel and a right rear wheel of the vehicle based on a measured rotational speed of the left rear wheel and a measured rotational speed of the right rear wheel in the first set of measurements,
   determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels, and
   determining whether an entirety of the first set of measurements conforms to the motion data model based on comparing the expected rotational speed against a second measurement of the rotational speed of the first one of the four wheels; and
   controlling, in response to determining that the entirety of the first set of measurements does not conform to the motion data model, the motion of the vehicle based on a second set of measurements.

2. The method of claim 1, wherein the first set of measurements comprises the first measurement of the steering angle of the vehicle;
   wherein the second measurement of the rotational speed of the first one of the four wheels comprises one of: a measurement of a first rotational speed of a left front wheel of the vehicle, a measurement of a second rotational speed of a right front wheel of the vehicle, a measurement of a third rotational speed of the left rear wheel of the vehicle, or a measurement of a fourth rotational speed of the right rear wheel of the vehicle; and
   wherein the motion data model defines:
   a first relationship between the steering angle of the vehicle and the first rotational speed of the left front wheel of the vehicle;
   a second relationship between the steering angle of the vehicle and the second rotational speed of the right front wheel of the vehicle;
   a third relationship between the steering angle of the vehicle and the third rotational speed of the left rear wheel of the vehicle;
   a fourth relationship between the steering angle of the vehicle and the fourth rotational speed of the right rear wheel of the vehicle; or
   any combination thereof.

3. The method of claim 2, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises:
   determining the expected rotational speed of the right front wheel based on the expected steering angle and the second relationship; and
   wherein the determination of whether the first set of measurements conforms to the motion data model is based on comparing the expected rotational speed of the right front wheel against the measurement of the second rotational speed.

4. The method of claim 2, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises:
   determining an expected first rotational speed of the left front wheel based on the expected steering angle and the first relationship; and
   wherein the determination of whether the first set of measurements conforms to the motion data model is based on comparing the expected first rotational speed against the measurement of the first rotational speed.

5. The method of claim 4, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises:
   determining whether the expected steering angle and the measurement of the third rotational speed of the left rear wheel conform to the third relationship; and
   responsive to determining that the expected steering angle and the measurement of the third rotational speed of the left rear wheel conform to the third relationship, determining the expected first rotational speed of the left front wheel based on the expected steering angle and the first relationship.

6. The method of claim 4, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises:
   determining whether the expected steering angle and the measurement of the fourth rotational speed of the right rear wheel conform to the fourth relationship; and
   responsive to determining that the expected steering angle and the measurement of the fourth rotational speed of the right rear wheel conform to the fourth relationship, determining the expected first rotational speed of the left front wheel based on the expected steering angle and the first relationship.

7. The method of claim 2, further comprising:
determining, based on comparing the first set of measurements and a set of expected measurements, that a first subset of the first set of measurements is to be used to control the motion of the vehicle; and
including the first subset of the first set of measurements in the second set of measurements.

8. The method of claim 7, further comprising:
determining that the first measurement of the steering angle and the measurement of the first rotational speed of the left front wheel conform to the first relationship;
determining that the first measurement of the steering angle and the measurement of the third rotational speed of the left rear wheel do not conform to the third relationship; and
including the first measurement of the steering angle and the measurement of the first rotational speed of the left front wheel in the second set of measurements.

9. The method of claim 8, further comprising:
determining a replacement measurement of the third rotational speed of the left rear wheel based on the first measurement of the steering angle and the measurement of the first rotational speed of the left front wheel; and
including the replacement measurement in the second set of measurements.

10. The method of claim 7, further comprising:
maintaining a historical average of the first measurement of the steering angle;
determining that the first measurement of the steering angle and the measurement of the first rotational speed of the left front wheel do not conform to the first relationship;
determining, in response to determining that the first measurement of the steering angle and the measurement of the first rotational speed of the left front wheel do not conform to the first relationship, that the first measurement of the steering angle matches the historical average of the first measurement; and
based on determining that the first measurement of the steering angle matches with the historical average, including the first measurement of the steering angle in the second set of measurements.

11. The method of claim 1, wherein determining whether an entirety of the first set of measurements conforms to the motion data model comprises:
determining a difference between each measurement of a set of expected measurements and each corresponding measurement of the first set of measurements;
assigning, based on a variance of the each of the first set of measurements, a weight to each difference between each measurement of the set of expected measurements and each corresponding measurement of the first set of measurements;
determining a weighted sum of the differences between each measurement of the set of expected measurements and each corresponding measurement of the first set of measurements;
updating the set of expected measurements to minimize the weighted sum of the differences; and
determining whether the entirety of the first set of measurements conforms to the motion data model based on whether the minimized weighted sum of the differences exceeds a threshold.

12. The method of claim 1, wherein the first set of measurements is obtained at a first time; and wherein the second set of measurements is of the steering angle and the rotational speeds of the four wheels of the vehicle obtained at a second time.

13. The method of claim 1, wherein the second set of measurements comprises a location of the vehicle.

14. The method of claim 1, wherein the second set of measurements is obtained via: an inertial measurement unit (IMU), a wireless receiver, or any combination thereof.

15. The method of claim 1, wherein the motion data model further comprises: track widths of the vehicle, a wheel base distance of the vehicle, or any combination thereof.

16. The method of claim 1, wherein the set of relationships are defined based on a calibration process that precedes the motion.

17. The method of claim 1, further comprising:
controlling an operation of the vehicle based on one of: the entirety of the first set of measurements, or the second set of measurements,
wherein the operation of the vehicle comprises a navigation operation to estimate: a location of the vehicle, a direction of motion of the vehicle, a speed of the vehicle along that direction, or any combination thereof.

18. The method of claim 1, wherein controlling the motion of the vehicle comprises an autonomous driving operation to adjust: a direction of motion of the vehicle, a speed of the vehicle, or any combination thereof.

19. The method of claim 1, wherein a first difference between the first measurement of the steering angle and the expected steering angle is within a threshold; and
wherein a second difference between the second measurement of the rotational speed of the first one of the four wheels and the expected rotational speed of the first one of the four wheels is within the threshold.

20. A system that is part of a vehicle comprising:
a network bus;
one or more sensors coupled with the network bus; and
at least one processor coupled with the network bus and configured to:
receive, from the one or more sensors and via the network bus, a first set of measurements of a steering angle and rotational speeds of four wheels of the vehicle in a motion;
obtain calibration parameters for a steering angle sensor of the one or more sensors, wherein the calibration parameters include a scaling factor, a bias term, and a noise term;
based on a motion data model that defines a set of relationships among the steering angle and the rotational speeds of the four wheels of the vehicle, and based on the first set of measurements:
determine an expected steering angle based on a first measurement of the steering angle of the first set of measurements, wherein determining the expected steering angle comprises applying the calibration parameters to the first measurement of the steering angle of the first set of measurements,
determine an expected average rotational speed of a left rear wheel and a right rear wheel of the vehicle based on a measured rotational speed of the left rear wheel and a measured rotational speed of the right rear wheel in the first set of measurements,
determine an expected rotational speed of a first one of the four wheels based on the expected steering angle, the expected average rotational speed of the left rear wheel and the right rear wheel, and a relationship between the steering angle of the vehicle and a rotational speed of the first one of the four wheels, and determine whether an entirety of the first set of measurements conforms to the motion data model based on comparing the expected rotational speed against a second measurement of the rotational speed of the first one of the four wheels; and control, in response to determining that the entirety of the first set of measurements does not conform to the motion data model, the motion of the vehicle based on a second set of measurements.

21. The system of claim 20, wherein the first set of measurements comprises the first measurement of the steering angle of the vehicle;

wherein the second measurement of the rotational speed of the first one of the four wheels comprises one of: a measurement of a first rotational speed of a left front wheel of the vehicle, a measurement of a second rotational speed of a right front wheel of the vehicle, a measurement of a third rotational speed of the left rear wheel of the vehicle, or a measurement of a fourth rotational speed of the right rear wheel of the vehicle; and wherein the motion data model defines:
a first relationship between the steering angle of the vehicle and the first rotational speed of the left front wheel of the vehicle;
a second relationship between the steering angle of the vehicle and the second rotational speed of the right front wheel of the vehicle;
a third relationship between the steering angle of the vehicle and the third rotational speed of the left rear wheel of the vehicle;
a fourth relationship between the steering angle of the vehicle and the fourth rotational speed of the right rear wheel of the vehicle; or
any combination thereof.

22. The system of claim 21, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises the at least one processor being configured to:

determine the expected rotational speed of the right front wheel based on the expected steering angle and the second relationship; and wherein the determination of whether the first set of measurements conforms to the motion data model is based on comparing the expected rotational speed of the right front wheel against the measurement of the second rotational speed.

23. The system of claim 21, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises the at least one processor being configured to:

determine the expected steering angle based on the first measurement of the steering angle;

determine an expected first rotational speed of the left front wheel based on the expected steering angle and the first relationship; and wherein the determination of whether the first set of measurements conforms to the motion data model is based on comparing the expected first rotational speed against the measurement of the first rotational speed.

24. The system of claim 23, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises the at least one processor being configured to:

determine whether the expected steering angle and the measurement of the third rotational speed of the left rear wheel conform to the third relationship; and responsive to determining that the expected steering angle and the measurement of the third rotational speed of the left rear wheel conform to the third relationship, determine the expected first rotational speed of the left front wheel based on the expected steering angle and the first relationship.

25. The system of claim 23, wherein determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels comprises the at least one processor being configured to:

determine whether the expected steering angle and the measurement of the fourth rotational speed of the right rear wheel conform to the fourth relationship; and responsive to determining that the expected steering angle and the measurement of the fourth rotational speed of the right rear wheel conform to the fourth relationship, determine the expected first rotational speed of the left front wheel based on the expected steering angle and the first relationship.

26. The system of claim 21, wherein the at least one processor is configured to:

determine, based on comparing the first set of measurements and a set of expected measurements, that a first subset of the first set of measurements is to be used to control the motion of the vehicle; and include the first subset of the first set of measurements in the second set of measurements.

27. The system of claim 26, wherein the at least one processor is configured to:

determine that the first measurement of the steering angle and the measurement of the first rotational speed of the left front wheel conform to the first relationship;

determine that the first measurement of the steering angle and the measurement of the third rotational speed of the left rear wheel do not conform to the third relationship; and include the first measurement of the steering angle and the measurement of the first rotational speed of the left front wheel in the second set of measurements.

28. The system of claim 27, wherein the at least one processor is configured to:

determine a replacement measurement of the third rotational speed of the left rear wheel based on the first measurement of the steering angle and the measurement of the first rotational speed of the left front wheel; and include the replacement measurement in the second set of measurements.

29. The system of claim 26, wherein the at least one processor is configured to:
maintain a historical average of the first measurement of the steering angle;
determine that the first measurement of the steering angle and the measurement of the first rotational speed of the left front wheel do not conform to the first relationship;
determine, in response to determining that the first measurement of the steering angle and the measurement of the first rotational speed of the left front wheel do not conform to the first relationship, that the first measurement of the steering angle matches the historical average of the first measurement; and
based on determining that the first measurement of the steering angle matches with the historical average, include the first measurement of the steering angle in the second set of measurements.

30. The system of claim 20, wherein determining whether the entirety of the first set of measurements conforms to the motion data model comprises the at least one processor being configured to:
determine a difference between each measurement of a set of expected measurements and each corresponding measurement of the first set of measurements;
assign, based on a variance of the each of the first set of measurements, a weight to each difference between each measurement of the set of expected measurements and each corresponding measurement of the first set of measurements;
determine a weighted sum of the differences between each measurement of the set of expected measurements and each corresponding measurement of the first set of measurements;
update the set of expected measurements to minimize the weighted sum of the differences; and
determine whether the entirety of the first set of measurements conforms to the motion data model based on whether the minimized weighted sum of the differences exceeds a threshold.

31. The system of claim 20, wherein the first set of measurements is obtained at a first time; and wherein the second set of measurements is of the steering angle and the rotational speeds of the four wheels of the vehicle obtained at a second time.

32. The system of claim 20, wherein the second set of measurements comprises a location of the vehicle.

33. The system of claim 20, wherein the second set of measurements is obtained via: an inertial measurement unit (IMU), a wireless receiver, or any combination thereof.

34. The system of claim 20, wherein the motion data model further includes: track widths of the vehicle, a wheel base distance of the vehicle, or any combination thereof.

35. The system of claim 20, wherein the set of relationships are defined based on a calibration process that precedes the motion.

36. The system of claim 20, wherein the at least one processor is configured to control an operation of the vehicle;
wherein the operation of the vehicle comprises a navigation operation to estimate: a location of the vehicle, a direction of motion of the vehicle, a speed of the vehicle along that direction, or any combination thereof.

37. The system of claim 20, wherein the at least one processor is configured to control the motion of the vehicle based on performing an autonomous driving operation to adjust: a direction of motion of the vehicle, a speed of the vehicle, or any combination thereof.

38. A non-transitory computer readable medium that stores a set of instructions which, when executed by a hardware processor of a vehicle, causes the hardware processor to:
receive, from one or more sensors of the vehicle, a first set of measurements of a steering angle and rotational speeds of four wheels of the vehicle in a motion;
obtain calibration parameters for a steering angle sensor of the one or more sensors, wherein the calibration parameters include a scaling factor, a bias term, and a noise term;
based on a motion data model that defines a set of relationships among the steering angle and the rotational speeds of the four wheels of the vehicle, and based on the first set of measurements:
determine an expected steering angle based on a first measurement of the steering angle of the first set of measurements, wherein determining the expected steering angle comprises applying the calibration parameters to the first measurement of the steering angle of the first set of measurements,
determine an expected average rotational speed of a left rear wheel and a right rear wheel of the vehicle based on a measured rotational speed of the left rear wheel and a measured rotational speed of the right rear wheel in the first set of measurements,
determine an expected rotational speed of a first one of the four wheels based on the expected steering angle, the expected average rotational speed of the left rear wheel and the right rear wheel, and a relationship between the steering angle of the vehicle and a rotational speed of the first one of the four wheels, and
determine whether an entirety of the first set of measurements conforms to the motion data model based on comparing the expected rotational speed against a second measurement of the rotational speed of the first one of the four wheels; and
control, in response to determining that the entirety of the first set of measurements does not conform to the motion data model, the motion of the vehicle based on a second set of measurements.

39. The non-transitory computer readable medium of claim 38, wherein the first set of measurements comprises the first measurement of the steering angle of the vehicle;
wherein the second measurement of the rotational speed of the first one of the four wheels comprises one of: a measurement of a first rotational speed of a left front wheel of the vehicle, a measurement of a second rotational speed of a right front wheel of the vehicle, a measurement of a third rotational speed of the left rear wheel of the vehicle, or a measurement of a fourth rotational speed of the right rear wheel of the vehicle; and
wherein the motion data model defines:
a first relationship between the steering angle of the vehicle and the first rotational speed of the left front wheel of the vehicle;
a second relationship between the steering angle of the vehicle and the second rotational speed of the right front wheel of the vehicle;
a third relationship between the steering angle of the vehicle and the third rotational speed of the left rear wheel of the vehicle;

a fourth relationship between the steering angle of the vehicle and the fourth rotational speed of the right rear wheel of the vehicle; or any combination thereof.

40. An apparatus for controlling a vehicle, comprising:

means for obtaining a first set of measurements of a steering angle and rotational speeds of four wheels of the vehicle in a motion;

means for obtaining calibration parameters for a means for measuring the steering angle, wherein the calibration parameters include a scaling factor, a bias term, and a noise term;

means for, based on a motion data model that defines a set of relationships among the steering angle and the rotational speeds of the four wheels of the vehicle, and based on the first set of measurements:

determining an expected steering angle based on a first measurement of the steering angle of the first set of measurements, wherein determining the expected steering angle comprises applying the calibration parameters to the first measurement of the steering angle of the first set of measurements, determining an expected average rotational speed of a left rear wheel and a right rear wheel of the vehicle based on a measured rotational speed of the left rear wheel and a measured rotational speed of the right rear wheel in the first set of measurements, determining an expected rotational speed of a first one of the four wheels based on the expected steering angle, the expected average rotational speed of the left rear wheel and the right rear wheel, and a relationship between the steering angle of the vehicle and a rotational speed of the first one of the four wheels, and determining, based on comparing the expected rotational speed against a second measurement of the rotational speed of the first one of the four wheels, whether an entirety of the first set of measurements conforms to the motion data model; and means for controlling, in response to determining that the entirety of the first set of measurements does not conform to the motion data model, the motion of the vehicle based on a second set of measurements.

41. The apparatus of claim 40, wherein the second measurement of the rotational speed of the first one of the four wheels comprises one of: a measurement of a first rotational speed of a left front wheel of the vehicle, a measurement of a second rotational speed of a right front wheel of the vehicle, a measurement of a third rotational speed of the left rear wheel of the vehicle, or a measurement of a fourth rotational speed of the right rear wheel of the vehicle; and wherein the motion data model defines:

a first relationship between the steering angle of the vehicle and the first rotational speed of the left front wheel of the vehicle;

a second relationship between the steering angle of the vehicle and the second rotational speed of the right front wheel of the vehicle;

a third relationship between the steering angle of the vehicle and the third rotational speed of the left rear wheel of the vehicle;

a fourth relationship between the steering angle of the vehicle and the fourth rotational speed of the right rear wheel of the vehicle; or any combination thereof.

* * * * *